(12) United States Patent
Katzenberger et al.

(10) Patent No.: US 8,413,307 B2
(45) Date of Patent: Apr. 9, 2013

(54) GUIDE ASSEMBLY AND METHOD

(75) Inventors: Michael D. Katzenberger, Florissant, MO (US); Ike C. Schevers, Festus, MO (US); Anthony P. Slade, St. Ann, MO (US); David L. Fritsche, Foristell, MO (US); James A. Hammond, Jr., O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 946 days.

(21) Appl. No.: 12/498,336

(22) Filed: Jul. 6, 2009

(65) Prior Publication Data

US 2011/0002751 A1 Jan. 6, 2011

(51) Int. Cl.
*B23P 19/04* (2006.01)

(52) U.S. Cl.
USPC ............ 29/240; 29/281.6; 408/111; 408/139; 408/204; 408/239 R

(58) Field of Classification Search ............... 29/240, 29/281.6, 426.4, 426.2; 408/241 G, 1 R, 408/101, 111, 204, 139, 239 R
See application file for complete search history.

(56) References Cited

U.S. PATENT DOCUMENTS

| | | | |
|---|---|---|---|
| 4,439,075 A * | 3/1984 | Wiederkehr | ............... 408/239 R |
| 4,688,315 A * | 8/1987 | Jannke | ......................... 29/426.4 |
| 5,342,153 A | 8/1994 | Dobkins | |
| 5,383,751 A | 1/1995 | Wheetley et al. | |
| 5,984,594 A * | 11/1999 | Osborne et al. | ............... 408/1 R |
| 6,413,022 B1 | 7/2002 | Sarh | |
| 6,472,676 B1 | 10/2002 | Douglas et al. | |
| 7,108,459 B1 | 9/2006 | Mueller | |
| 7,578,642 B2 | 8/2009 | Fritsche et al. | |
| 2007/0086868 A1 | 4/2007 | Ray | |
| 2008/0115628 A1 | 5/2008 | Shirai | |

FOREIGN PATENT DOCUMENTS

| | | |
|---|---|---|
| DE | 3741644 | 6/1989 |
| GB | 2299772 | 10/1996 |
| WO | WO2006131311 | 12/2006 |

OTHER PUBLICATIONS

Piab USA Inc., "PIAB Modular Automation Tooling," available at <http://www.piab.com/Templates/Page.aspx?id=13193>, last visited Jul. 6, 2009.

SMC Corporation, "SMC Products Overview: Vacuum," available at <http://www.smcusa.com/sections/products/vacuum.asp>, last visited Jul. 6, 2009.

International Search Report, PCT/US/2010040954, dated Oct. 18, 2010.

* cited by examiner

*Primary Examiner* — Richard Chang

(74) *Attorney, Agent, or Firm* — Novatech IP Law

(57) ABSTRACT

A method of engaging a fastener may include attaching a guide assembly to a structure. The guide assembly may include a first arm, a second arm, and a head assembly mounted to an end of the first arm. The method may further include threadably engaging a tool sleeve to the head assembly, coupling a tool to the tool sleeve, and adjusting and clamping the angular orientation of the second arm relative to the first arm using a swivel mechanism. The method may additionally include engaging the tool to a fastener, rotating the tool sleeve relative to the head assembly, and applying a down force to the fastener in response to rotating the tool sleeve to move the tool axially relative to the head assembly.

8 Claims, 14 Drawing Sheets

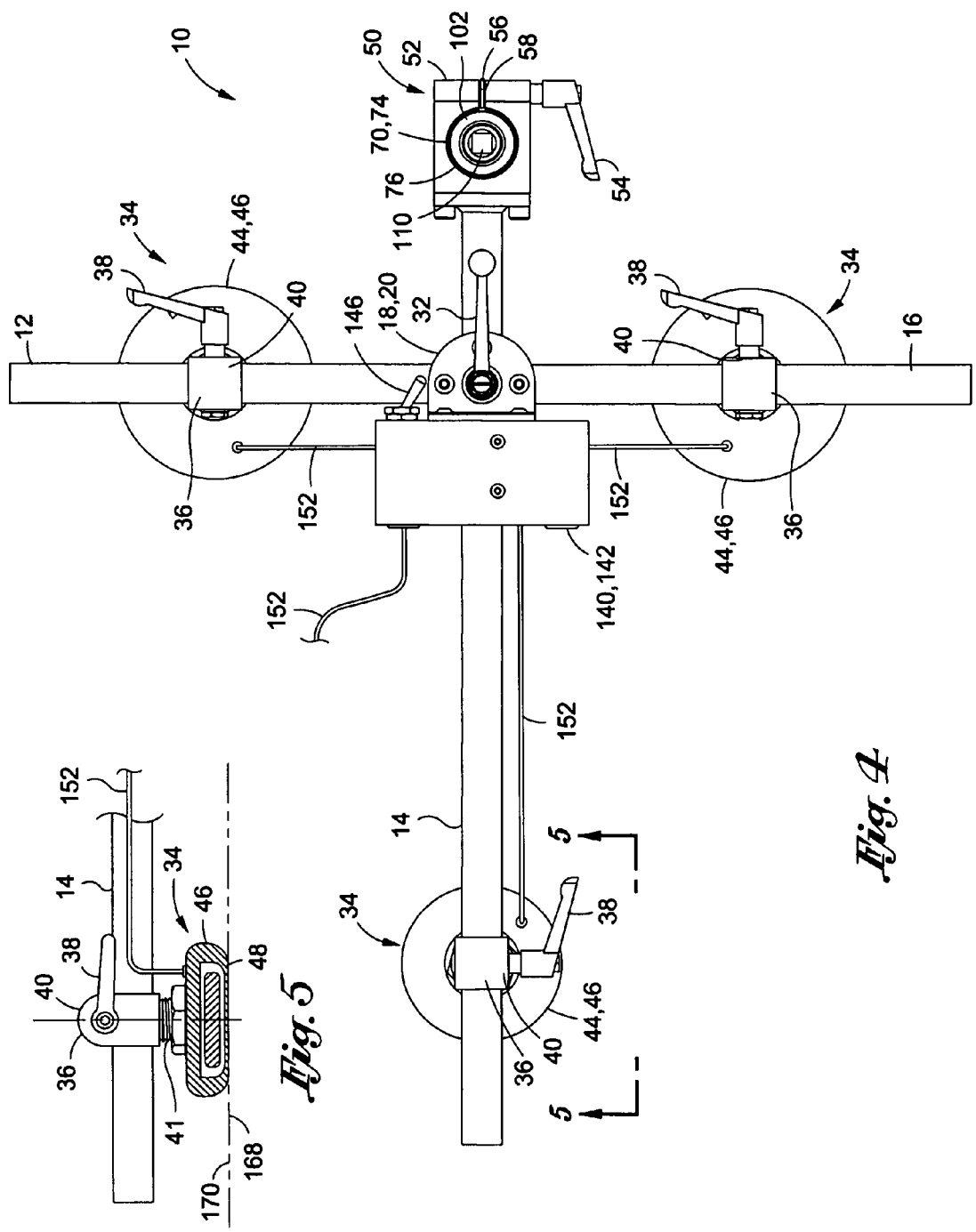

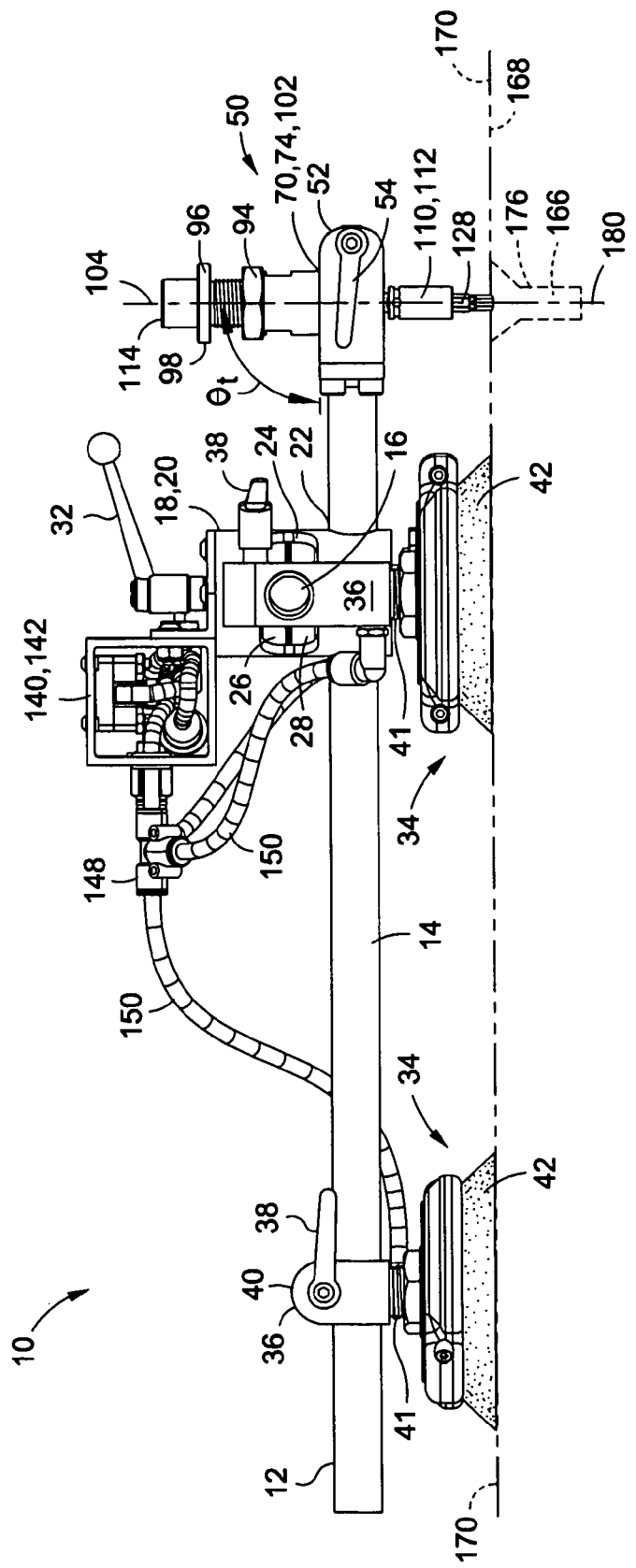

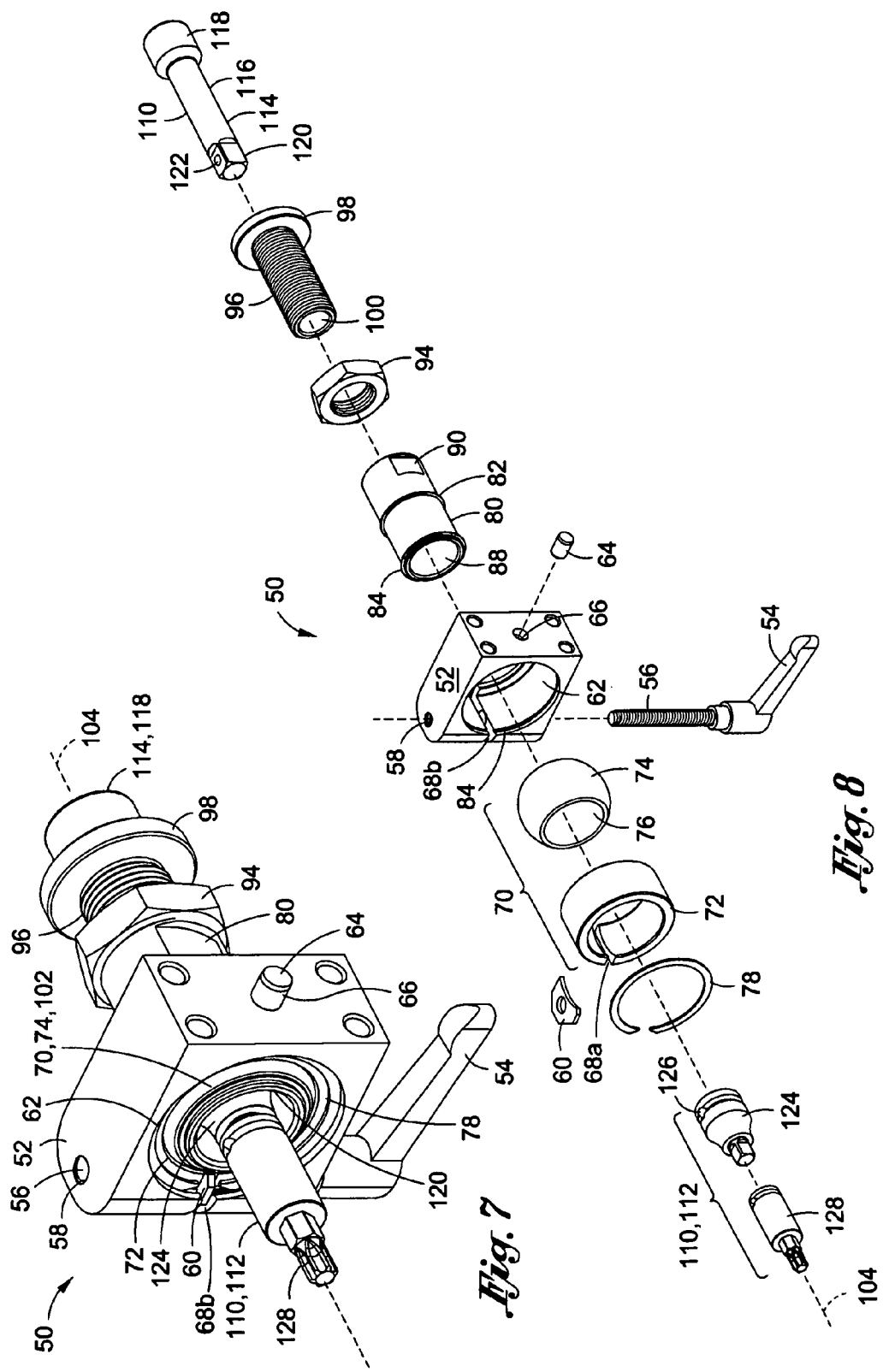

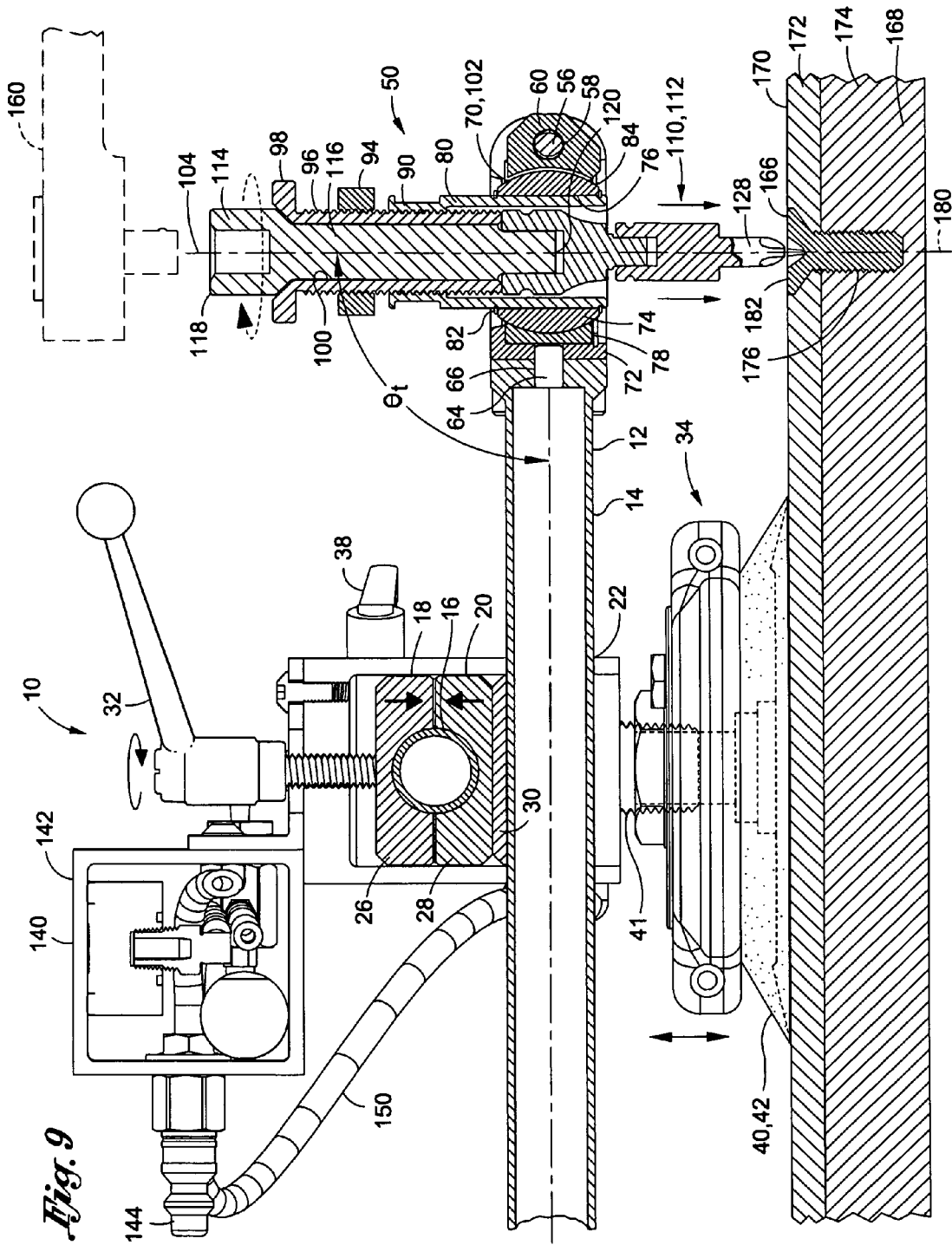

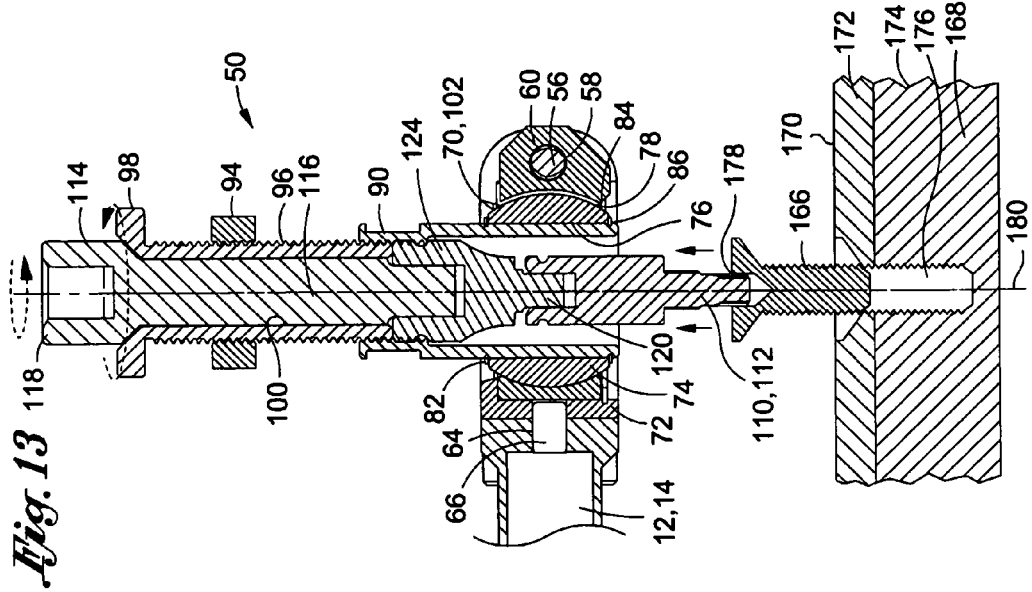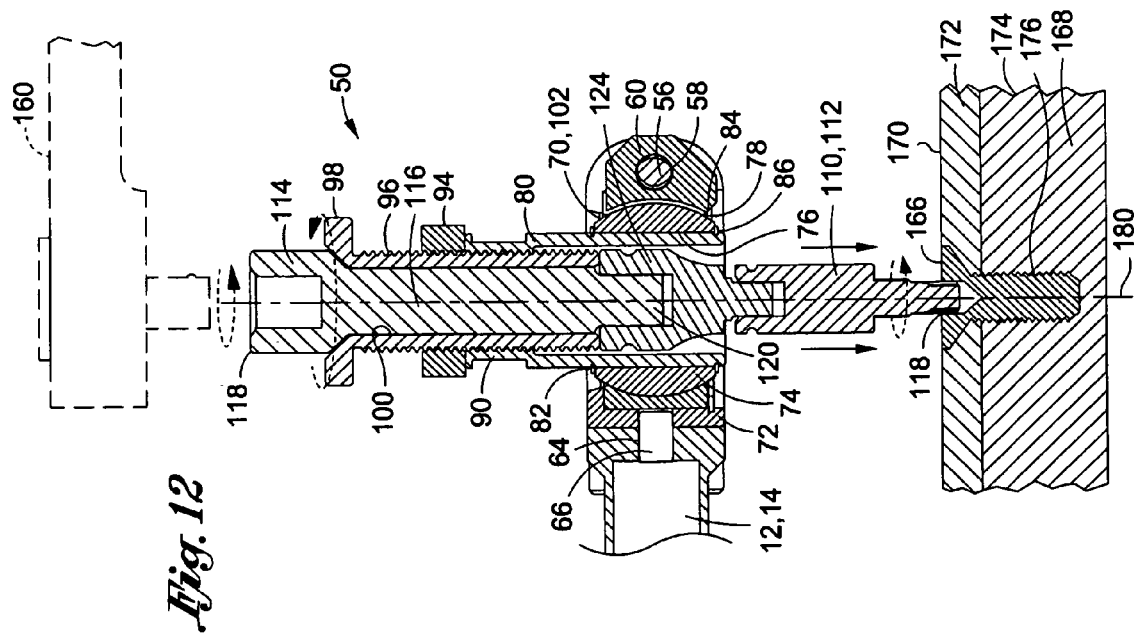

GUIDE ASSEMBLY AND METHOD

CROSS-REFERENCE TO RELATED APPLICATIONS (Not Applicable)

STATEMENT RE: FEDERALLY SPONSORED RESEARCH/DEVELOPMENT (Not Applicable)

FIELD

The present disclosure relates generally to fastener removal and, more particularly, to mechanisms adapted for removal of threaded fasteners.

BACKGROUND

During the inspection, repair and replacement of various components of an assembly, it may be necessary to remove one or more fasteners attaching a component to a mating structure. Unfortunately, certain fasteners may be difficult to remove due to the buildup of corrosion around the fastener hole which may bond or freeze the fastener in place over time. Sealants and coatings applied to the fastener after installation may also bond the fastener in place preventing removal of the fastener in a conventional manner using conventional tools.

For example, attempts to remove a machine screw that is frozen in place by engaging a screwdriver to a tool recess of the screw head may result in stripping out or deforming the tool recess and preventing further engagement thereof with the screwdriver. Attempts to remove a bolt that is frozen in place by engaging a box-end wrench or an open-end wrench to the bolt head may result in deforming or rounding off of the bolt head and eliminating the ability to further engage the wrench to the bolt head. In addition, attempts to remove a bolt that is frozen in place may result in shearing off of the bolt head at the surface of the structure leaving only the bolt shaft embedded in the structure.

Prior art solutions for removing frozen fasteners include the use of screw extractors which have sharpened flutes or teeth running along a length of the screw extractor. The teeth of such screw extractors are typically manually driven into an engagement hole that is drilled into the stripped fastener head or into the remaining shaft portion of the fastener. The engagement hole must be slightly smaller in diameter than the outer diameter of the screw extractor such that as the screw extractor is driven into the engagement hole, the teeth of the screw extractor can become sufficiently embedded into the inner diameter of the engagement hole. Once the screw extractor is sufficiently engaged to the engagement hole, a wrench or ratchet may be applied to a free end of the screw extractor and the fastener may be rotated and removed from the structure.

In order to avoid damage to the threaded bore into which the frozen fastener is installed, it is typically necessary that the engagement hole is generally aligned with the fastener. For example, for small diameter fasteners, to avoid drilling the engagement hole out of the side of the fastener shaft and damaging the threaded bore, the centerline of the engagement hole must be generally aligned with the centerline of the fastener. In addition, it is typically necessary that the engagement hole is centered on the fastener head or on the fastener shaft to avoid damage to the threaded bore.

A further requirement associated with the use of conventional screw extractors is that a sufficient amount of down force must be applied to the screw extractor in order to drive the screw extractor into the engagement hole such that the teeth of the screw extractor can become sufficiently embedded into the inner diameter. In this regard, incomplete or insufficient engagement of the screw extractor teeth into the engagement hole can result in stripping out of the engagement hole when rotating the screw extractor. Furthermore, in certain applications, it may be necessary to apply a down force to the screw extractor while simultaneously rotating the screw extractor during removal of the fastener to prevent the teeth of the screw extractor from becoming disengaged from the engagement hole which may result in stripping out the engagement hole.

The effectiveness of conventional screw extractors in removing frozen fasteners is dependent in part upon the skill of the operator both in forming the engagement hole in alignment with the fastener and in applying a sufficient amount of down force to engage the teeth of the screw extractor into the engagement hole. Performing such operations in the field adds complexity to the task and reduces the effectiveness of conventional screw extractors in removing certain fastener installations. For example, it may be necessary to remove a frozen fastener from an area that is difficult to access or which requires drilling an engagement hole in the fastener at an awkward angle. In addition, the fastener may be installed in a contoured surface making it difficult to determine the proper orientation for positioning a drill gun such that the drill bit is aligned with the fastener centerline.

As can be seen, there exists a need in the art for a system and method for removing a fastener that facilitates forming an engagement hole in a fastener and wherein the engagement hole is aligned with and centered on the fastener. Furthermore, there exists a need in the art for a system and method for removing a fastener wherein a sufficient amount of down force may be applied to the screw extractor in order to drive the screw extractor teeth into engagement with the engagement hole. Additionally, there exists a need in the art for a system and method for removing a fastener from a structure wherein the alignment of the screw extractor may be maintained while continuously applying a down force to the screw extractor during removal of the fastener. Finally, there exists a need in the art for a system and method for removing a fastener wherein the above-described alignment and down force requirements may be applied to fasteners installations in contoured surfaces.

SUMMARY

The above noted needs associated with extraction of frozen fasteners are specifically addressed and alleviated by the present disclosure which provides a guide assembly that may be mounted to a structure or a workpiece and which is adapted for removing fasteners from the structure. The guide assembly may comprise a frame assembly, a plurality of clamping assemblies mounted to the frame assembly and a head assembly mounted to the frame assembly. In an embodiment, the frame assembly may include first and second arms which may be adjustably positionable relative to one another to facilitate attachment of the frame assembly to the structure. The clamping assemblies may be mountable to the frame assembly and may be orientatable relative thereto to facilitate attachment of the frame assembly to the structure. The clamping assemblies may be provided in a variety of alternative configurations including, but not limited to, vacuum cup assemblies and magnet assemblies. The frame assembly may also be secured in position relative to the structure without the aid of vacuum cup assemblies, magnet assemblies or mechanical attachment. For example, the frame assembly may be configured to be manually held in position against the structure. The guide assembly may further include the head assembly which may be mounted to the frame assembly. The head assembly may optionally be used independent of the frame assembly. For example, the head assembly may be removably secured to tooling that may be independent of the structure and wherein the tooling may maintain the head assembly in position relative to the structure.

The head assembly may include a removable tool. Notably, the tool may be axially movable relative to the head assembly in order to cause the tool to exert a down force on the fastener when the frame assembly is attached to the structure. The tool may be provided in a variety of different configurations. For example, the tool may be configured as a screw drive bit for engaging a fastener. In this regard, the screw drive bit may be configured as a fastener bit for engaging a tool recess formed in the fastener. The screw drive bit may also be configured as an extractor bit for extracting fasteners which may be frozen in position in the structure. In addition, the screw drive bit may comprise a fastener bit such as a Phillips head drive, a slotted drive, a Torx drive, an Allen drive (i.e., internal hex), a socket drive (i.e., external hex) or any one of a variety of alternative internal and external drive configurations for engaging an internal or external feature of a fastener head. The tool may also be configured as a drill guide for drilling an engagement hole in a fastener or drilling a fastener hole in the structure.

Advantageously, the head assembly may include an alignment mechanism including a bearing assembly such as a spherical bearing for providing adjustability of an orientation of the tool relative to the frame assembly. In this regard, the alignment mechanism may facilitate alignment of the tool (e.g., drill guide) with an axis or centerline of a hole in the structure. In addition, the alignment mechanism may facilitate alignment of the tool with a centerline of a fastener to which the tool (e.g., extractor bit, screw drive bit) may be engaged. In an embodiment, the alignment mechanism may comprise a bearing assembly including a spherical bearing which may be rotatably contained or mounted within a bearing collar contained or housed within a head body of the head assembly.

The head assembly may include a mechanism by which the position of the alignment mechanism may be fixed following adjustment of the orientation thereof. In this manner, the tool may be axially and positionably aligned with the fastener and/or with a hole after the frame assembly is attached or mounted to the structure. The down force may be applied by the head assembly by means of rotating a tool sleeve which may be threadably coupled to the head assembly. Rotation of the tool sleeve may result in axial movement of the tool relative to the head assembly. For example, rotation of the tool sleeve in a clockwise direction may result in movement of the tool away from the head assembly. When the frame assembly is mounted to the structure, movement of the tool away from the head assembly (i.e., toward the structure) results in the application of the down force to the fastener to which the tool may be engaged.

In an embodiment, the frame assembly may include first and second arms. At least one of the first and second arms may have at least one of the clamping assemblies adjustably mounted thereto. Furthermore, each one of the clamping assemblies may be rotatably or orientatably positionable relative to the first and second arms to which each one of the clamping assemblies may be mounted. The frame assembly may further include a swivel mechanism which may interconnect the first and second arms. The swivel mechanism may be configured such that an orientation of the first and second arms is adjustable relative to one another. In this manner, the first and second arm may be oriented in an optimal position relative to one another to facilitate attachment of the guide assembly to a variety of different structure configurations.

The alignment mechanism may include the tool sleeve which may be sized and configured to receive a drill guide. The drill guide may be sized and configured to be inserted or mounted within the tool sleeve. In this regard, the drill guide may be removably installable within the tool sleeve and may include a drill bore that may be sized and configured to receive a drill bit. The drill bit may be used for drilling an engagement hole in the fastener and/or for drilling a fastener hole in the structure at a predetermined hole location. In an alternative embodiment, the tool sleeve may comprise the drill guide such that the drill guide is directly engaged to the alignment mechanism.

The present disclosure also includes a method of engaging a fastener mounted or installed in the structure. The method may comprise the steps of attaching the guide assembly to the structure followed by inserting the drill guide into the tool sleeve. The tool sleeve may be aligned with the fastener by rotating the spherical bearing until the tool sleeve is substantially aligned with a fastener axis of the fastener. The methodology may further include drilling the engagement hole in the fastener followed by removal of the drill guide from the tool sleeve and installation of a drive member in the tool sleeve. The drive member may comprise a drive shaft that may be sized and configured to be rotatable within the tool sleeve.

A tool such as a screw extractor bit may be coupled to an end of the drive member. The tool (e.g., screw extractor bit) may be placed in engaging contact with the engagement hole of the fastener by axially moving the tool sleeve relative to the head assembly. For example, by rotating the threadably coupled tool sleeve into the head assembly, the tool may be non-rotatably and axially moved into engagement with the engagement hole of the fastener. By continuously moving the tool sleeve axially relative to the spherical bearing (i.e., head assembly), a down force may be applied to the tool in order to drive the tool (i.e., screw extractor bit) into the engagement hole of the fastener. Upon engagement of the screw extractor bit into the engagement hole, the fastener may be removed by rotating the drive member. For example, for removing a fastener having right-hand threads, rotation of the drive member in a counter-clockwise direction results in removal of the fastener from the fastener hole. In addition, by minimizing or preventing rotation of the tool sleeve when the drive member is rotated, a down force may be continuously maintained on the fastener to maintain engagement of the tool within the engagement hole.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 4 is a top illustration of an embodiment of the guide assembly wherein the clamping assemblies are configured as magnetic mechanisms for magnetic attachment of the guide assembly to the structure;

FIG. 5 is a sectional illustration of one of the magnetic mechanisms taken along line 5-5 of FIG. 4 and illustrating one of the magnetic mechanisms configured as an electromagnetic;

FIG. 6 is a side illustration of the guide assembly illustrating the tool of the head assembly engaged to the fastener;

FIG. 7 is a perspective illustration of the head assembly illustrating the tool engaged to an alignment mechanism contained within a head body of the head assembly;

FIG. 8 is an exploded perspective illustration of the head assembly and illustrating the alignment mechanism configured as a bearing assembly having a spherical bearing for adjusting an orientation of the tool relative to the frame assembly;

FIG. 9 is a sectional illustration of the guide assembly taken along line 9-9 of FIG. 3 and illustrating the interconnectivity of the various components which make up the head assembly and further illustrating a swivel mechanism for interconnecting the first and second arms of the frame assembly;

FIG. 12 is a sectional illustration of the head assembly illustrating rotation of the tool while a down force is applied thereto for removal of the fastener;

FIG. 13 is a sectional illustration of the head assembly illustrating a position of the tool relative to the head assembly following removal of the fastener from a fastener hole;

DETAILED DESCRIPTION

Figure 1:
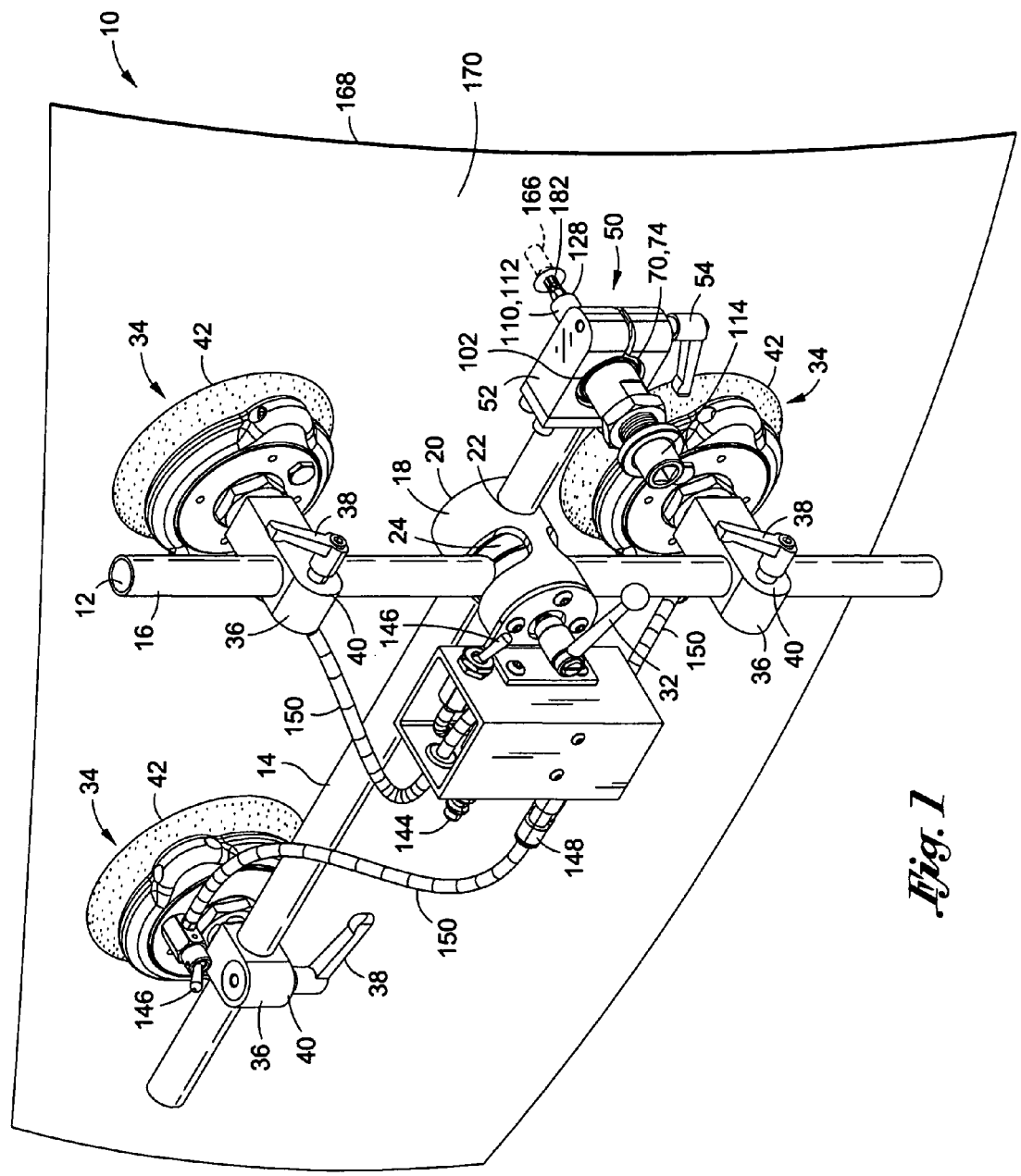
FIG. 1 is a top perspective illustration of an embodiment of a guide assembly shown as being attached to a structure or a workpiece and further illustrating a fastener to which a tool of the guide assembly may be engaged for removal from the structure.

Referring now to the drawings wherein the showings are for purposes of illustrating preferred and various embodiments of the disclosure only and not for purposes of limiting the same, shown in FIGS. 1-6 is a guide assembly 10 in an embodiment as may be used for removing fasteners 166 from a structure 168. In addition, the guide assembly 10 may be employed for drilling fastener holes 176 in the structure 168 by orienting a drill bit 164 into alignment with the structure 168 and/or maintaining alignment while drilling the fastener hole 176. Toward this end, the head assembly 50 may include an alignment mechanism 102 for adjusting an orientation of a tool 110 that may be coupled to the alignment mechanism 102. The tool 110 may be provided in a variety of configurations including, but not limited to, a screw drive bit 128 for engaging a fastener 166.

The tool 110 may be also configured as a drill guide 130 having a guide bore 132 for guiding a drill bit 164 as may be used for drilling fastener holes 176 in the structure 168 or drilling engagement holes 178 in a fastener 166 that may be frozen in place in the structure 168. Upon drilling the engagement hole 178 in the fastener 166, the drill guide 130 may be removed from the alignment mechanism 102 and a screw drive bit 128 or screw extractor bit may be mounted to the head assembly for engaging the engagement hole 178 such that the fastener 166 may be removed. Advantageously, the guide assembly 10 is configured to apply a down force to the tool 110 to force the extractor bit into the engagement hole 178 such that the fastener 166 may then be rotatably removed from the structure 168.

As can be seen in FIGS. 1-6, the guide assembly 10 may comprise a frame assembly 12, a plurality of clamping assemblies 34 and a head assembly 50. In an embodiment, the frame assembly 12 may include first and second arms 14, 16 which may be adjustably positioned relative to one another in order to facilitate mounting of the guide assembly 10 on a wide variety of structures 168 of varying sizes, shapes and configurations. For example, the guide assembly 10 may be configured to facilitate attachment of the frame assembly 12 to one or more portions of the structure 168 or to one or more surfaces 170 of the structure 168. Such surfaces 170 may include planar surfaces, contoured or curved surfaces, or any combination thereof.

The guide assembly 10 may include the plurality of clamping assemblies 34 which may be provided in a variety of different configurations for attaching the guide assembly 10 to the structure 168 such as to a surface 170 of the structure 168. For example, in a preferred embodiment, the clamping assemblies 34 may be configured as one or more vacuum cup assemblies 42. Each one of the vacuum cup assemblies 42 may include one or more vacuum cups to which a vacuum may be applied in order to secure the guide assembly 10 to the surface 170. The vacuum cup assembly 42 facilitates attachment of the guide assembly 10 to contoured or curved surfaces. In this regard, the guide assembly 10 is adapted for field operations including maintenance and repair operations away from a production or assembly facility. For example, the vacuum cup assembly 42 may facilitate attachment of the guide assembly 10 to a contoured surface 170 of an aircraft for removal of fasteners 166 and/or for drilling fastener holes 176.

However, as may be appreciated, the guide assembly 10 may be used in a variety of different applications and industries and on different types of structure and is not limited for use with aircraft assemblies. In this regard, the guide assembly 10 may be used for engaging fasteners 166 and/or for drilling fastener holes 176 in any vehicular or non-vehicular application including any system, subsystem, assembly, subassembly, apparatus or environment. Furthermore, the guide assembly 10 may be used in any operation where alignment of a tool 110 with a structure 168 and/or a surface 170 thereof is desired. In this regard, the guide assembly 10 is not limited to facilitate aligning of a drill guide 130 with the structure 168 for drilling holes or for engaging a screw drive bit 128 with a fastener 166.

Referring briefly to FIGS. 4-5, the clamping assemblies 34 may be configured as magnet assemblies 44 wherein each magnet assembly 44 may comprise one or more magnets. The magnets may be configured as permanent magnets and/or as electromagnets. The magnet assemblies 44 may be adapted to attach the frame assembly 12 to a structure 168 by magnetic attraction to a ferrous or magnetically attractable material of the structure 168. Further in this regard, the clamping assemblies 34 may be configured in a variety of alternative embodiments and are not limited to the vacuum cup assembly 42 or magnet assembly 44 configurations. For example, each one of the clamping assemblies 34 may be configured as a mechanical attachment mechanism (not shown) for mechanically coupling the frame assembly 12 to a structure 168 such as by engaging surface features of the structure 168. For example, the structure 168 may include fastener or non-fastener elements to which the frame assembly 12 may be configured to engage. Even further, it is contemplated that the clamping assemblies 34 may comprise non-mechanical means for attaching the frame assembly 12 to the structure 168. For example, the clamping assemblies 34 may be configured to releasably bond the frame assembly 12 to the structure 168.

It is further contemplated that the frame assembly 12 may be configured to be held in place against a structure 168 such as by a technician grasping a portion of the frame assembly 12 and urging the frame assembly 12 toward the structure 168. The frame assembly 12 may be provided in a configuration that facilitates grasping of the device by one or more technicians. The frame assembly 12 may be held in position during use of the head assembly 50 to remove a fastener 166 or to drill a fastener hole 176 or an engagement hole 178. For example, the frame assembly 12 may be configured to manually held or secured in position against the structure 168 by a technician without the aid of vacuum force applied through vacuum cup assemblies 42. Likewise, the frame assembly 12 may be configured to manually held or secured in position against the structure 168 by a technician without the aid of magnetic force acting through magnet assemblies 44. The frame assembly 12 may also be configured to be held in position without the aid of mechanical attachment of the frame assembly 12 to the structure 168 and/or without the aid of releasably bonding the frame assembly to the structure 168.

In this regard, it is contemplated that the head assembly 50 may be used independent of the frame assembly 12. For example, the frame assembly 12 may be configured as a hand held device (not shown) which may be grasped and held in place by a technician while another technician uses the head assembly 50 to remove a fastener 166 or to drill a fastener hole 176 or engagement hole 178 in a manner described below. A portion of such a hand held device may optionally be placed in contact with a portion of the structure 168 as a means to index the head assembly 50 relative to the structure 168. It is further contemplated that the head assembly 50 may be secured to a separate fixture (not shown) that may be independent of the head assembly 50 and may also be independent of the structure 168 being operated upon. For example, the head assembly 50 may be permanently or releasably secured to one or more tooling arms or tooling fixtures (not shown) that are separate from the structure 168. Such tooling arms or tooling fixtures may provide a means to position the head assembly 50 relative to the structure 168.

Referring to FIGS. 1-6, each one of the clamping assemblies 34 may be configured to be adjustably orientatable relative to the frame assembly 12 to facilitate mounting of the frame assembly 12 to one or more planar surfaces and/or contoured surfaces. Toward this end, each one of the clamping assemblies 34 may be configured to be pivotably adjustable or rotatable about the first or second arm 14, 16 to which the clamping assembly 34 is mounted as described in greater detail below. The guide assembly 10 may further include the head assembly 50 which may be fixedly mounted to the frame assembly 12 and which may include the tool 110 in one or more configurations. The tool 110 may be configured to be axially movable relative to the head assembly 50 to facilitate the application of the down force by the tool 110 onto the surface 170. Axial movement of the tool 110 may also facilitate the application of the down force to a surface feature 182 of the structure 168. Such surface features 182 may comprise a fastener 166 such as a bolt or a screw or any other threaded or non-threaded fasteners and including non-fastener elements which may be mounted to the structure 168.

The tool 110 may be configured as the screw drive bit 128 which may be provided as a screw extractor bit for engaging a fastener 166 which may be frozen or bonded to the structure 168 due to buildup of corrosion or sealant. The screw drive bit 128 may also be configured as a fastener bit to engage a drive recess in the fastener 166 to allow for installation and/or removal of the fastener 166. The fastener bit may be configured as a Phillips head drive, slotted drive, Torx drive, Allen drive (i.e., internal hex), socket drive (i.e., external hex) or any one of a variety of alternative internal and external drive configurations for engaging internal or external drive features of the fastener 166.

Advantageously, the head assembly 50 is adapted such that the tool 110 is axially movable relative to the head assembly 50 to enable the tool 110 to exert the down force on the structure 168 or surface 170 and/or on the fastener 166 when the frame assembly 12 is attached to the structure 168 or surface 170. In this manner, the guide assembly 10 facilitates the application of the down force against the fastener 166 to maintain engagement of the screw drive bit 128 or fastener bit with the fastener 166. In this regard, the down force minimizes the risk of inadvertent disengagement of the tool 110 which may result in deforming or stripping of the internal (e.g., drive recess) or deforming external drive features such as an external hex fastener head of the fastener 166.

Figure 2:
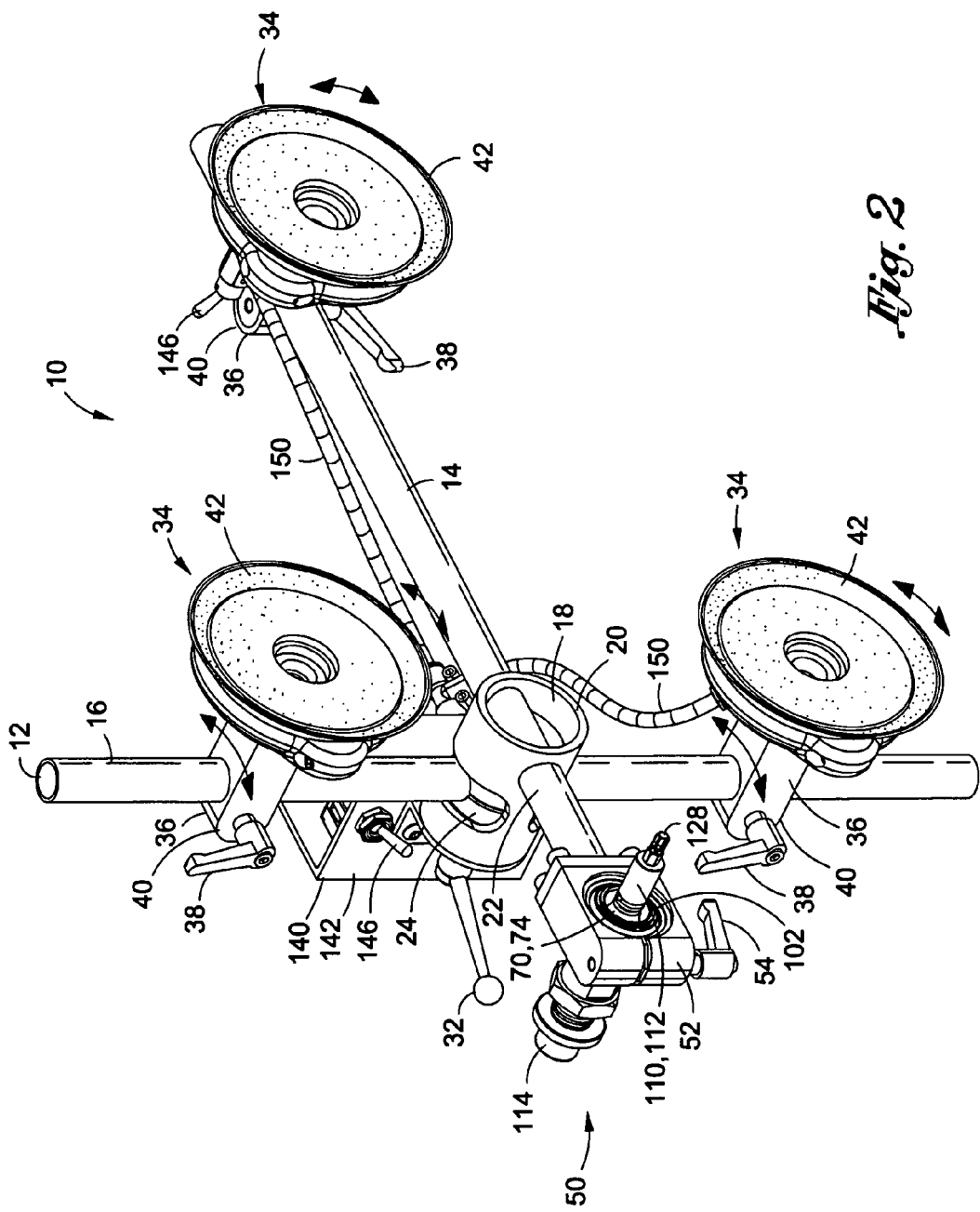
FIG. 2 is a bottom perspective illustration of an embodiment of the guide assembly illustrating a plurality of clamping assemblies mountable to a frame assembly of the guide assembly and further illustrating a head assembly having the tool coupled thereto.
Figure 3:
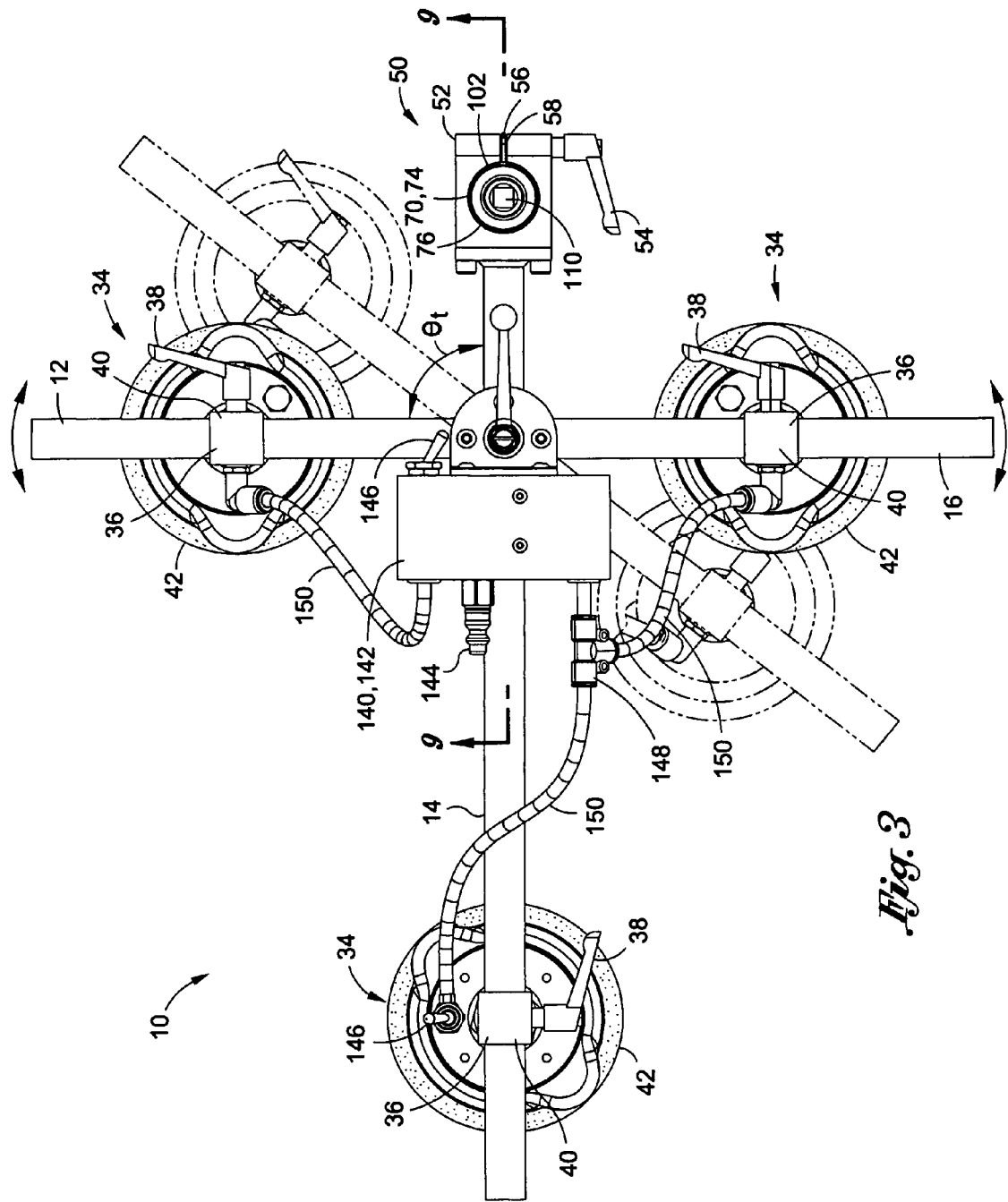
FIG. 3 is a top illustration of the guide assembly illustrating the clamping assemblies mounted on first and second arms of the frame assembly and further illustrating the head assembly mounted to the frame assembly.

Referring particularly now to FIGS. 1-3, shown is the frame assembly 12 which, in an embodiment, may comprise the first and second arms 14, 16 and including a swivel mechanism 18. The swivel mechanism 18 may provide a means for interconnecting the first and second arms 14, 16 to one another. The swivel mechanism 18 may also be configured to provide adjustable positioning of the first arm 14 relative to the second arm 16. For example, the swivel mechanism 18 may facilitate positioning the first and second arms 14, 16 into the cruciform position as shown in FIGS. 1-4 wherein the second arm 16 is oriented substantially perpendicularly relative to the first arm 14 such that a tube angle $\theta_t$ between the first and second arms 14, 16 is substantially 90 degrees. In addition, the swivel mechanism 18 may facilitate adjusting the first and second arms 14, 16 into a non-perpendicular orientation wherein the tube angle $\theta_t$ defines an acute angle. For example, FIG. 3 illustrates the second arm 16 in phantom and positioned non-perpendicularly relative to the first arm 14. In this manner, the swivel mechanism 18 provides a means for adjusting the relative positions of the first and second arms 14, 16 to facilitate mounting of the frame assembly 12 to a variety of different structure 168 configurations.

Referring briefly to FIG. 9, shown is a cross-sectional illustration of the guide assembly 10 illustrating the swivel mechanism 18. In an embodiment, the swivel mechanism 18 may include a generally hollow swivel housing 20 containing an upper fitting 26, an intermediate fitting 28 and a lower fitting 30. Each one of the upper fitting 26, intermediate fitting 28 and lower fitting 30 may be slightly axially movable with the swivel housing 20. The second arm 16 may pass through a pair of slotted openings 24 formed on diametrically opposed sides of the swivel housing 20. As shown in FIG. 9, the second arm 16 may be clamped between semi-cylindrical channels or other features that may be formed in the upper and intermediate fitting 26, 28.

Likewise, the first arm 14 may be clamped between a lower fitting 30 and a pair of swivel housing bores 22 formed on diametrically opposed sides of the swivel housing 20. The first arm 14 may extend through the swivel housing bores 22 allowing the first arm 14 to be axially positioned relative to the swivel housing 20. For example, the first arm 14 may be slid through the swivel housing bore 22 to bias the length of the first arm 14 to one side of the swivel housing 20 as distinguished from the generally equalized positioning of the first arm 14 relative to the swivel housing 20 illustrated in FIGS. 1-4. Adjustment of the relative positions of the first and second arms 14, 16 may be facilitated by rotating the swivel handle 32. For example, by rotating the swivel handle 32 in a clockwise direction, the second arm 16 may be clamped between the upper fitting 26 and the intermediate fitting 28 and the first arm 14 may simultaneously be clamped between the lower fitting 30 and the swivel housing bores 22. Counterclockwise rotation of the swivel handle 32 results in loosening or unclamping of the first and second arms 14, 16 between the upper, intermediate and lower fitting 26, 28, 30 to allow free rotation of the first arm 14 relative to the second arm 16 and to also allow axial adjustment of each one of the first and second arms 14, 16 along the respective lengths thereof.

Referring to FIG. 2, the swivel housing 20 may include a diametrically opposed pair of slotted openings 24 as indicated above to facilitate positioning or rotation of the second arm 16 relative to the first arm 14. For example, as shown in FIG. 3, the second arm 16 may be rotated from a 90 degree tube angle $\theta_t$ to a non-perpendicular tube angle $\theta_t$ as illustrated. Although the second arm 16 is illustrated as extending through the slotted openings 24 and the first arm 14 extending through the swivel housing bores 22, the swivel mechanism 18 may be configured such that the second arm 16 extends through the cylindrical swivel housing bores 22 and the first arm 14 extends through the slotted openings 24. In addition, it should be noted that the frame assembly 12 is not limited to the arrangement shown in FIGS. 1-4 comprising first and second arms 14, 16. For example, it is contemplated that the frame assembly 12 may be configured as a non-movable structure wherein the positions of the arms are fixed relative to one another. In an alternative embodiment, the frame assembly 12 may be configured with additional arms and is not limited to the first and second arms 14, 16 as shown in the illustrated embodiments. Even further, it should be noted that the frame assembly 12 may be configured in any configuration for attaching the guide assembly 10 to the structure 168 such as to the surface 170 of the structure 170. In addition, as described above, the guide assembly 10 may be configured to be maintained in position without attaching the frame assembly 12 to the structure 168.

Referring to FIG. 2, shown is a perspective view of the guide assembly 10 illustrating an embodiment wherein the clamping assemblies 34 may be adjustably rotatable on the first and second arms 14, 16. In the embodiment shown, the second arm 16 may include a pair of clamping assemblies 34 located on opposing sides of the second arm 16 although any number of clamping assemblies 34 may be mounted to the second arm 16 including a single one of the clamping assemblies 34. The first arm 14 may include one or more clamping assemblies 34 although only a single one of the clamping assemblies 34 is shown mounted to the first arm 14. Each one of the clamping assemblies 34 may be adjustably orientatable relative to the arm to which they are mounted in order to facilitate alignment of the clamping assembly 34 with the structure 168 to which the frame assembly 12 may be mounted. In the embodiment shown, each one of the clamping assemblies 34 may be mounted to the first and second arms 14, 16 by means of a clamp mechanism 40. The clamp mechanism 40 may comprise a clamp fitting 36 having a clamp handle 38 for clamping and unclamping of the clamp fitting 36 to the first and second arms 14, 16.

The clamp handle 38 may include a threaded shaft extending into a threaded bore formed in the clamp mechanism 40. The clamp fitting 36 may include a spacing dividing the clamp fitting 36 into opposing side portions. Rotation of the clamp handle 38 (e.g., in a clockwise direction) causes relative axial motion of the opposing side portions of the clamp fitting 36 drawing the side portions together to clamp the clamp fitting 36 to the first arm 14 or second arm 16. Counterclockwise rotation of the clamp handle 38 disengages the clamp fitting 36 from the arm to which the clamp fitting 36 is mounted and allowing free rotation of the clamping assembly 34 relative to the arm. For example, as shown in FIG. 2, each one of the clamping assemblies 34 may rotate about an axis of the first arm 14 or second arm 16 to which it is mounted. In this manner, each one of the clamping assemblies 34 may be adjusted in order to be substantially aligned with a local area of the structure 168 or surface 170 to which the frame assembly 12 is to be mounted. It is also contemplated that the clamp fittings 36 may provide an additional degree of adjustability of the clamping assemblies 34 relative to the arms and is not limited to single-axis rotation about the axes of the arms. For example, although FIGS. 1-6 illustrate an embodiment wherein the clamping assemblies 34 are mounted such that rotation of the clamping assemblies 34 is limited to a single axis, it is contemplated that the clamp mechanism 40 may be provided with an articulated arrangement to facilitate rotation or adjustment of the clamping assemblies 34 about two or more axes to increase the ability to substantially align the clamping assemblies 34 with the local structure 168 or surfaces 170 to which the clamping assemblies 34 may be mounted.

Referring briefly to FIG. 9, further adjustment of the positioning of the clamping assemblies 34 may be provided by a mounting shaft 41 to facilitate axial or height adjustment of the clamping assemblies 34 relative to the first or second arm 14, 16 to which the clamping assembly 34 is mounted. Such axial or height adjustment of the clamping assemblies 34 provides an additional measure by which the frame assembly 12 may be adjusted to be complementary to a structure 168 or surface 170 to which the frame assembly 12 may be mounted. By rotating the shaft and/or by rotating the clamping assembly 34 about the shaft, the distance from the clamping assembly 34 to the arm may be adjusted. A jam nut may be provided on the mounting shaft 41 such that the axial position of the clamping assembly 34 may be locked in place after adjustment.

Referring still to FIGS. 1-6, in a preferred embodiment of the guide assembly 10, the clamping assemblies 34 may be configured as vacuum cup assemblies 42 for vacuum or suction attachment to one or more surfaces 170 of the structure 168. Each one of the vacuum cup assemblies 42 may comprise one or more vacuum cups which may be mounted to the first and/or second arms 14, 16 by means of the clamp mechanism 40 as described above. Although shown as having a generally circular shape, the vacuum cup assemblies 42 may be provided in any configuration and are not limited to the size, shape or configuration illustrated. In order to attach the vacuum cup assemblies 42 to the surface 170, vacuum may be provided to each one of the vacuum cup assemblies 42 by means of one or more conduits 150 which may be interconnected at a manifold 148. Vacuum may be provided by a vacuum source 144 such as a compressor pump (not shown) or other suitable vacuum supply. The vacuum source 144 may be fluidly connected to the guide assembly 10 by means of the fitting shown in FIG. 3 which may extend outwardly from a control module housing 142 of a control module 140 of the guide assembly 10.

The control module 140 may house a variety of components for regulating the vacuum for distribution to each one of the vacuum cup assemblies 42. For example, the control module 140 may house components including, but not limited to, sensors, regulators, filters, check and/or safety valves and a variety of additional components that may be required for operating the clamping assemblies 34. An activation switch 146 for regulating operation of the clamping assemblies 34 may be included with the control module housing 142 to initiate the application of vacuum to the vacuum cup assemblies 42. Deployment of the activation switch 146 may cause a vacuum source 144 to apply a vacuum force to each one of the vacuum cup assemblies 42 through the conduits 150. Selective control of each one of the vacuum cup assemblies 42 may be provided by individual activation switches 146 for each one of the vacuum cup assemblies 42 such as the activation switch 146 mounted on the vacuum cup assembly 42 of the first arm 14 as illustrated in FIG. 3.

Referring briefly to FIGS. 4-5, shown is an embodiment of the guide assembly 10 wherein the clamping assemblies 34 are configured as magnet assemblies 44 for facilitating magnetic attachment of the guide assembly 10 to the structure 168. For example, one or more of the magnet assemblies 44 may be mounted on each of the first and/or second arms 14, 16 as illustrated in FIG. 4 similar to that which is illustrated with respect to the vacuum cup assemblies 42 of FIGS. 1-3. In an embodiment, each one of the magnet assemblies 44 may comprise one or more permanent magnets. Alternatively, each one of the magnetic mechanisms may comprise one or more electromagnets 48. Each electromagnet 48 may be activated by applying electric current to generate an electromagnetic field creating attraction with ferrous or otherwise magnetically-attractable material of the structure 168 in a manner known in the art.

As shown in FIG. 5, the magnet assemblies 44 may comprise the electromagnet 48 configuration which may be electrically connected to a power source by suitable wiring 152 or other conductive means for delivering electric current. The electromagnets 48 may be activated by deploying the activation switch 146 which may be mounted on the control module housing 142 and/or on each one of the magnet assemblies 44. Although shown as having a generally disc-shaped configuration, the magnet assemblies 44 may be provided in any size, shape and configuration. Furthermore, each one of the magnet assemblies 44 may be configured to be positonable or orientatable relative to the first or second arm 14, 16 to which they are mounted in a manner similar to that which is described above with regard to the vacuum cup assemblies 42.

Referring now to FIGS. 6-14, shown is the head assembly 50 of the guide assembly 10. In an embodiment, the head assembly 50 may be fixedly mounted to the frame assembly 12 such as by mechanical attachment utilizing one or more fasteners extending from an end of the first arm 14 into a corresponding number of threaded bores formed in a head body 52 of the head assembly 50 as shown in FIG. 7. The head assembly 50 is configured such that a tool 110 is axially movable relative to the head assembly 50 in order to cause the tool 110 to exert a down force onto a structure 168 or surface 170 or onto a fastener 166 to which the tool 110 may be engaged. The down force may be applied as a result of attachment of the frame assembly 12 to the structure 168 or surface 170 by means of the clamping assemblies 34. The head assembly may be used independent of the frame assembly and the down force may alternatively be applied as a result of attachment of the head assembly to separate tooling or fixtures (not shown) as described above.

Figure 11:
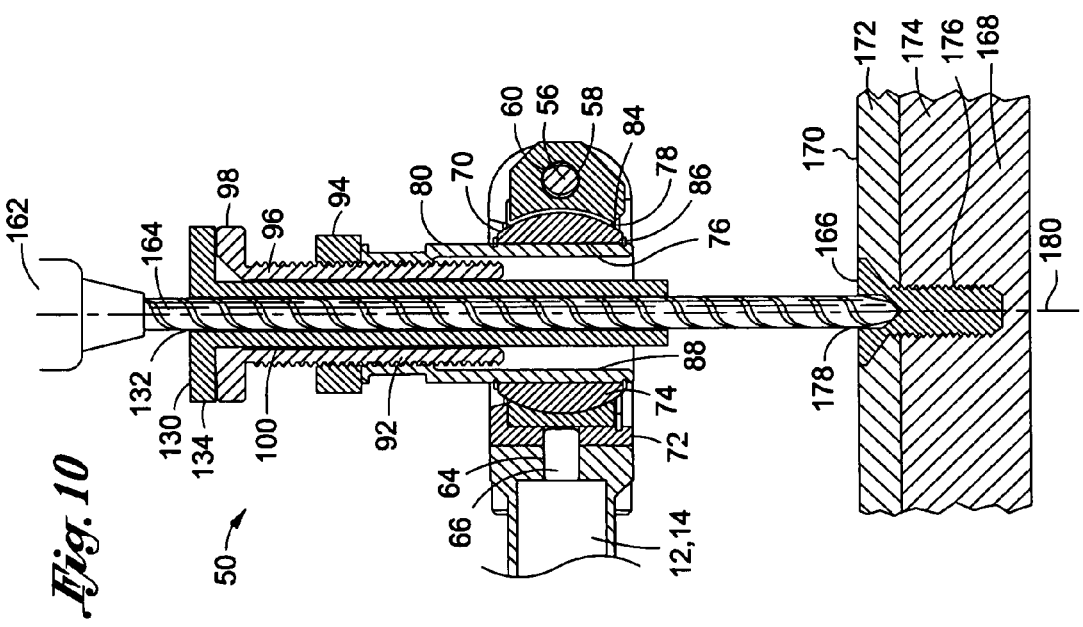
FIG. 11 is a sectional illustration of the head assembly wherein the drill guide is replaced with a drive member having the tool coupled to an end thereof for engaging the engagement hole that may be formed in the fastener.

As can be seen in FIGS. 7-8, the head assembly 50 may include a tool sleeve 96 which may be threadably coupled to the head assembly 50 such that rotation of the tool sleeve 96 results in axial movement of the tool 110. For example, clockwise rotation of the tool sleeve 96 may result in movement of the tool 110 away from the head assembly 50 while counterclockwise rotation of the tool sleeve 96 may result in drawing the tool 110 toward the head assembly, depending upon the thread configuration coupling the tool sleeve 96 to the head assembly 50 (i.e., left-hand threads or right-hand threads). As shown in FIG. 11, rotation of the tool sleeve 96 results in movement of the tool 110 toward the fastener 166 installed in the structure 168. Conversely, rotation of the tool sleeve 96 in a counterclockwise direction draws the tool 110 upwardly toward the head assembly 50 and away from the fastener 166 as described in greater detail below.

Referring to FIG. 8, the head assembly 50 may include an alignment mechanism 102 in order to facilitate adjusting an orientation of the tool 110 relative to the frame assembly 12. The alignment assembly provides a means for orienting the tool 110 such that a tool axis 104 of the tool 110 may be aligned with a fastener axis 180 of the fastener 166. The alignment mechanism 102 may also facilitate orienting the tool 110 into alignment with a hole axis of a hole to be drilled at a predetermined hole location 184. In an embodiment, the alignment mechanism 102 may comprise a bearing assembly 70 to facilitate adjustable orientation of a head angle $\theta_h$ of the tool 110 relative to the frame assembly 12 as shown in FIGS. 6 and 9. For example, the bearing assembly 70 may comprise a spherical bearing 74 which may be rotatably mounted within a bearing collar 72 as best seen in FIG. 8. The bearing collar 72 may, in turn, be housed or contained within the head body 52.

As shown in FIG. 8, the bearing collar 72 may include a slot 68a at a radial position of the bearing collar 72 to facilitate clamping of the spherical bearing 74 at a desired orientation. Likewise, the head body 52 may include a slot 68b at a radial position thereof as shown in FIG. 7 such that the spherical bearing 74 may be clamped into position following adjustment of an orientation of the tool 110. The head assembly 50 may include a head handle 54 having a threaded shaft 56 extending into a threaded bore 58 formed in the head body 52. Rotation of the head handle 54 facilitates clamping or unclamping of the bearing collar 72 around the spherical bearing 74. A spacer 60 may be receivable within the slots 68a, 68b formed in the head body 52 and the bearing collar 72 to maintain the bearing collar 72 in position within the head body 52. The threaded shaft 56 may extend through a hole in the spacer 60 in order to retain the spacer 60 with the head assembly 50. The spacer 60 may have a reduced thickness relative to a width of the slots 68a, 68b such that the bearing collar 72 may be clamped around the spherical bearing 74. The spacer 60 may maintain the angular position of the slot 68b in alignment with the slot 68a to prevent rotation of the bearing collar 72 to a position that may limit the ability to clamp the bearing collar 72 around the spherical bearing 74.

To facilitate alignment of the head body 52 with the frame assembly 12, an alignment pin 64 may be provided with the frame assembly 12 wherein the alignment pin 62 is insertable into a recess 66 formed in the head body 52. The alignment pin 64 may extend outwardly from an end of the frame assembly 12 as shown in FIGS. 7-9 and may facilitate mounting of the head body 52 onto the frame assembly 12. As noted above, the head body 52 may be fixedly mounted to the frame assembly 12 using one or more mechanical fasteners extending from an end of the first arm 14 into a corresponding number of threaded bores in the head body 52 as shown in FIG. 7. The alignment pin 64 may facilitate the substitution of one configuration of the head assembly 50 with a different configuration of the head assembly 50 by maintaining alignment therebetween. In addition, the alignment pin 64 may facilitate the transfer of shear load between the head assembly 50 and the frame assembly 12 as may occur during application of the down force by the head assembly 50 onto a fastener 166 during extraction thereof or during drilling of a fastener hole 176 into the structure 168. As may be appreciated, a variety of different mechanisms may be incorporated into the head body 52 to maintain the alignment of the head body 52 relative to the frame assembly 12.

Referring still to FIG. 8, the head assembly 50 may include the bearing collar 72 as noted above. The bearing collar 72 may be axially fixed or captured within a body bore 62 of the head body 52 by means of a mechanical feature such as a bearing snap ring 78 that may be received within a groove 86 formed in the head body 52 as shown in FIGS. 8-13. The head body 52 may include a ridge optionally formed on a side of the head body 52 opposite the bearing snap ring 78 and groove 86 such that the head body 52 may contain the bearing collar 72. The bearing collar 72 may be adapted to receive a bearing sleeve 80 preferably sized and configured to fit within the bearing bore 76 of the spherical bearing 74. The bearing sleeve 80 may include sleeve snap rings 84 and/or sleeve ribs formed on one or both of opposing sides of the spherical bearing 74 in order to maintain axial positioning of the bearing sleeve 80 relative to the spherical bearing 74. The bearing sleeve 80 may extend outwardly from one of axially opposing ends of the spherical bearing 74. The bearing sleeve 80 may include a bearing sleeve bore 88 for receiving the tool sleeve 96. As can be seen in FIG. 8, the tool sleeve 96 may have a threaded cylindrical outer diameter for threadably engaging an internally threaded portion 92 of the bearing sleeve 80. The rotation of the tool sleeve 96 results in axial motion of the tool 110. As indicated above, such axial motion facilitates the application of a down force on a fastener 166 when the guide assembly 10 is mounted to the structure 168. As illustrated in FIG. 8, the bearing sleeve 80 may include one or more flats 90 on an exterior of the bearing sleeve 80 as a means to rotate the tool sleeve 96 relative to the bearing sleeve 80. Rotation of the tool sleeve 96 may be provided by means of the tool sleeve flange 98 which may be formed on one of opposing ends of the tool sleeve 96. A jam nut 94 may be threadably coupled to the threaded tool sleeve 96 to lock the position of the tool sleeve 96 relative to the bearing sleeve 80.

Referring still to FIG. 8, the head assembly 50 may include a drive member 114 having a drive shaft 116 which may be rotatably inserted into the tool sleeve bore 100. The drive member 114 may have a proximal end 118 and a distal end 120. The proximal end 118 may include a recess for receiving an internal drive such as a square drive of a conventional ratchet wrench 160 or other drive mechanism for rotating the drive member 114. The distal end 120 of the drive member 114 may include an external square drive or other suitable end configuration to which an adapter 124 may be coupled. In an embodiment, the adapter 124 and screw drive bit 128 may comprise a screw guide assembly 112. As shown in FIG. 8, the tool 110 such as the screw drive bit 128 may be releasably engaged to an end of the adapter 124 by means of a square drive formed on the adapter 124. The adapter 124 may include an internal recess for coupling to the distal end 120 of the drive member 114. However, the adapter 124 may be altogether omitted and the tool 110 may be directly coupled to the drive member 114. A ball 122 and detent 126 mechanism may be provided in any one of the interfaces between the drive member 114, adapter 124 and tool 110 to maintain engagement therebetween.

Referring to FIG. 9, shown is a sectional illustration of the head assembly 50 illustrating the drive member 114 mounted within the tool sleeve 96 which, in turn, is threadably coupled to the bearing sleeve 80. The bearing sleeve 80 may be axially fixed relative to the spherical bearing 74 but may be rotatably adjustable in relation to the spherical bearing 74. The adapter 124 and/or the tool 110 are preferably sized and configured to fit within the bearing sleeve 80. For example, the adapter 124 and/or the tool 110 may have an outer diameter which is preferably no larger than an inner diameter of the internally threaded portion 92 of the bearing sleeve 80. In this manner, rotation of the tool sleeve 96 may draw the adapter 124 and/or tool 110 upwardly into the bearing sleeve 80. However, by maintaining the outer diameters of the tool 110 and adapter 124 less than the inner diameter of the threaded portion of the bearing sleeve 80, the adapter 124 and tool 110 may be axially moved through the entire length of the bearing sleeve 80. Such an arrangement may facilitate installation of the adapter 124 and tool 110 into the bearing sleeve 80. However, the outer dimensions of the adapter 124 and/or tool 110 may be larger than the inner dimension of the bearing sleeve 80 such that attachment of the adapter 124 and/or tool 110 to the drive member 114 must be performed on a side of the head assembly 50 opposite the drive member 114 (i.e., below the head assembly) when the frame assembly 12 is mounted to the structure 168 as illustrated in FIG. 9.

Referring still to FIG. 9, shown is the tool 110 which is illustrated as a screw drive bit 128. The screw drive bit 128 may have a fastener bit configuration adapted to engage drive recesses such as a Phillips, slot, Torx, Allen, etc. which may be formed in a fastener 166 head of a fastener 166. In this manner, the guide assembly 10 may be employed for installation and removal of fasteners 166. In this regard, installation or removal of a fastener 166 may be facilitated with the use of a ratchet or wrench 160 or any other suitable tool 110 engaging the drive member 114. For example, the ratchet wrench 160 illustrated in FIG. 9 may include a square drive for engaging the internal recess in the proximal end 118 of the drive member 114.

Installation of the fastener 166 into the structure 168 as illustrated in FIG. 9 may be facilitated by threadably engaging the tool sleeve 96 into the bearing sleeve 80 by rotating the tool sleeve flange 98 by hand/or by using an appropriate fixture. The tool sleeve flange 98 may include flats, knurls, or other features which may facilitate grasping and rotating the tool sleeve flange 98. As can be seen, rotation of the tool sleeve 96 in a clockwise direction results in axial movement of the tool 110 away from the head assembly. The adapter 124 may include an upper circumferential edge which may bear against a lower edge of the tool sleeve 96. In this manner, the down force is transmitted between the lower end of the tool sleeve 96 and the adapter 124 and between the adapter 124 and the tool 110. In an embodiment, the drive member 114 is freely rotatable within the tool sleeve 96. The drive member 114 may be non-rotatable while the tool sleeve 96 is rotated in order to axially move the tool 110 into engagement with the fastener 166 without rotating the tool 110.

Following engagement of a tip of the tool 110 with the fastener 166 drive recess as shown in FIG. 9, the drive member 114 may then be rotated in unison with the tool sleeve 96 in order to threadably engage the fastener 166 into the fastener hole 176. Conversely, to remove the fastener 166 from the fastener hole 176, the drive member 114 and the tool sleeve 96 may be rotated in unison in a counterclockwise direction. However, the down force applied to the fastener 166 may be controlled by holding the tool sleeve 96 stationary while rotating the drive member 114 or by rotating the tool sleeve 96 at a slower rate than the rate at which the drive member 11 is rotated. Increasing amounts of down force may be applied by maintaining the tool sleeve 96 in a non-rotating manner while the drive member 114 is rotated when removing the fastener 166 from the fastener hole 176.

Increasing amounts of down force may be desirable for removing frozen fasteners 166 to maintain engagement of the tool 110 tip with the fastener 166. In an embodiment, the guide assembly 10 may facilitate the application of the down force of up to 300 pounds or greater. As may be appreciated, the magnitude of the down force is dependent at least in part upon the strength of the attachment between the clamping assemblies 34 and the structure 168. The magnitude of the down force may be proportional to the collective magnitudes of the suction forces at each one of the vacuum cup assemblies 42. For magnet assembly 44 configurations of the clamping assemblies 34, the magnitude of the down force may be dependent upon the magnitude of the attraction with the structure 168 to which the frame assembly 12 is attached. Other factors affecting the magnitude of the down force include the general stiffness and strength of the frame assembly 12.

Figure 10:
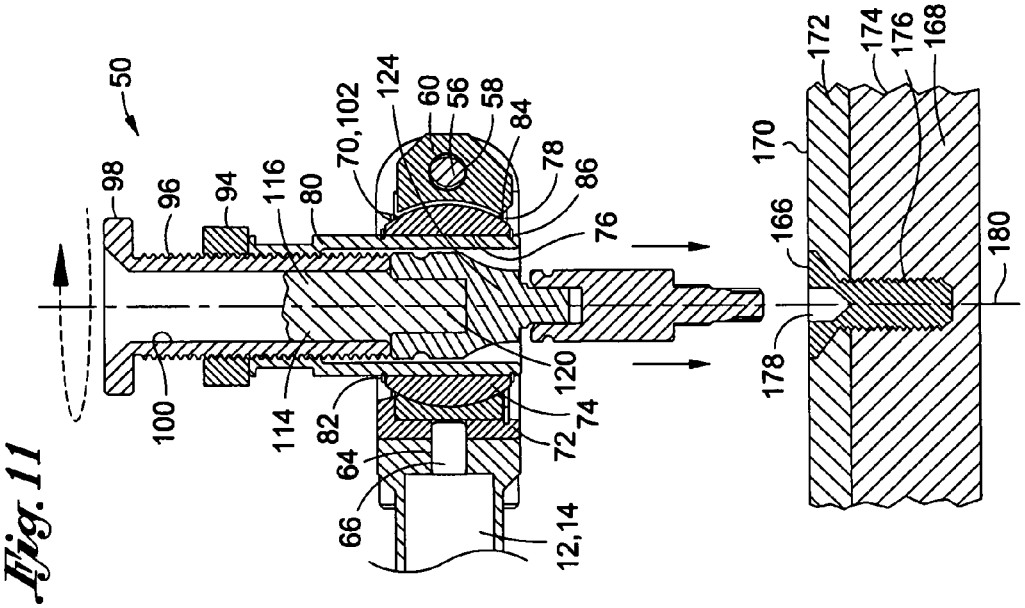
FIG. 10 is a sectional illustration of the head assembly having a drill guide inserted thereinto for receiving a drill bit to drill an engagement hole in the fastener.
Figure 14:
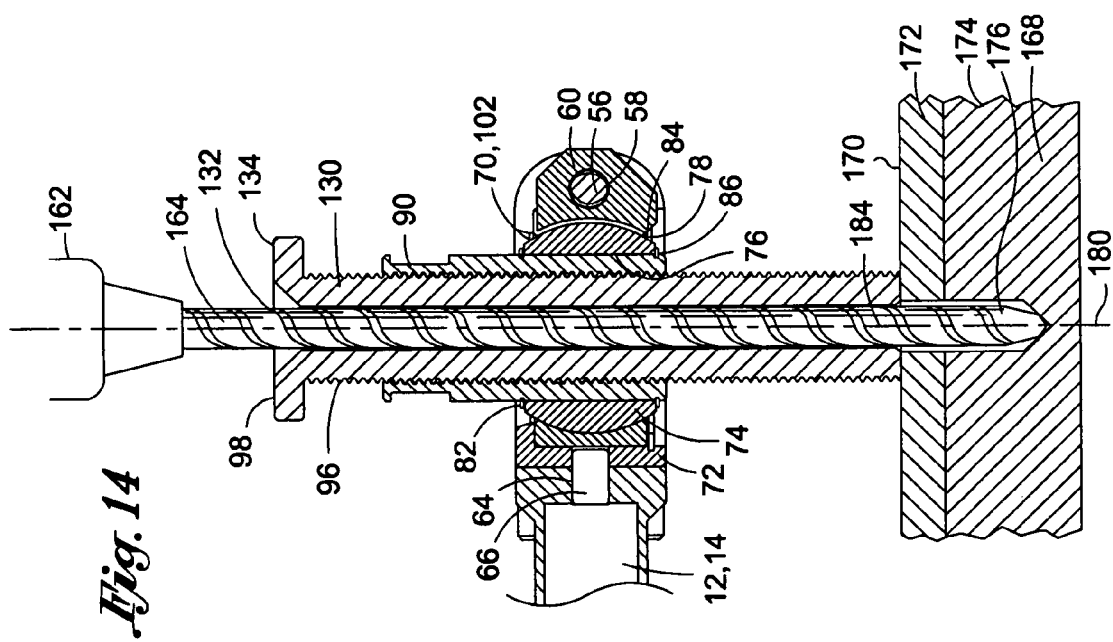
FIG. 14 is a sectional illustration of the head assembly having a drill guide in contacting engagement with the structure for applying a down force to the structure during drilling of a fastener hole in the structure.

Referring to FIG. 10, shown is a sectional illustration of the head assembly 50 wherein the tool sleeve 96 includes a drill guide 130 that may be sized and configured to accept a drill bit 164 for forming an engagement hole 178 in the fastener 166 or a fastener hole 176 in a structure 168. As can be seen, the drill guide 130 may include a guide flange 134 for engagement with the tool sleeve flange 98 of the tool sleeve 96. Although the drill guide 130 is illustrated as having a length that results in a spacing between an end of the drill guide 130 and the surface 170, the drill guide 130 may alternatively be provided in a length that extends to the surface 170 as shown in FIG. 14. By providing the drill guide 130 in a length that contacts the surface 170 into which the hole is to be formed, a down force may be applied to the surface 170 while drilling the hole which may stabilize the structure 168 into which the hole is drilled.

For example, as illustrated in FIG. 14, the structure 168 may comprise a first element 172 disposed in layered arrangement to a second element 174. The fastener 166 may extend through the first and second elements 172, 174. By providing the drill guide 130 in a length that contacts the surface 170, the first element 172 and second element 174 may resist spreading apart adjacent the fastener hole and drawing in burrs or chips generated by the drilling process. By apply the down force to the first and second elements 172, 174 using the end of the tool sleeve 96/drill guide 130, the tendency of the first and second elements 172, 174 to develop a spacing that may draw in chips is reduced. In addition, by providing the drill guide 130 in a length that may be placed in contacting relation with the surface 170, bending of an unsupported portion of the drill bit 164 may be reduced. In this regard, the drill guide 130 may improve the locational accuracy by which holes may be drilled. The drill guide 130 may be sized to fit within the tool sleeve 96 as shown in FIG. 10. Alternatively, the tool sleeve 96 may be configured as the drill guide 130 and may be directly engaged to the bearing sleeve 80 as shown in FIG. 14.

Referring to FIGS. 11-13, shown is a sequence of operations during which a fastener 166 may be removed using the guide assembly 10. In the embodiment illustrated in FIG. 11, the tool sleeve 96 may be rotated in a clockwise manner (i.e., for right-hand threads) in order to axially move the tool 110 downwardly away from the head assembly 50 and into engagement with an engagement hole 178 which may be formed in the fastener 166. As was earlier mentioned, the engagement hole 178 may be formed using a drill guide 130 placed in the tool sleeve 96 as shown in FIG. 10. Referring to FIG. 12, shown is the tool 110 engaged to the engagement hole 178 of the fastener 166 due to the rotation of the tool sleeve 96 relative to the bearing sleeve 80 and resulting axial movement of the tool 110. In this regard, FIG. 12 illustrates initiation of removal of the fastener 166 after the tool 110 is engaged to the engagement hole 178. In this regard, rotation of the drive member 114 results in rotation of the fastener 166 for removal from the fastener hole 176. If the tool sleeve 96 is maintained in non-rotating relation to the drive member 114 or reduced rotation relative to the drive member 114 while the drive member 114 is rotated, the down force on the fastener 166 will increase as the fastener 166 moves upwardly out of the fastener hole 176. In this manner, the down force may be regulated in order to maintain engagement of the tool 110 with the fastener 166. The tool sleeve 96 and drive member 114 may also be rotated in unison to remove the fastener 166 from the fastener hole 176 without increasing the down force.

FIG. 13 illustrates disengagement of the threaded fasteners 166 from the fastener hole 176 by rotation of the drive member 114. As can be seen, the jam nut 94 that is threadably coupled to the tool sleeve 96 and may rotate with the tool sleeve 96 during the fastener 166 removal process. The fastener 166 may be removed from the tool 110 and a replacement fastener 166 may be inserted using conventional methods. As indicated above, the tool 110 may be provided in a variety of configurations. For example, the tool 110 may be provided as a screw drive bit 128 configured as an extractor bit for extracting a fastener 166 frozen in position. The tool 110 may also be provided as a fastener bit for installing and/or removing a fastener 166 by engaging the tool 110 to a drive recess formed in the fastener 166 or by using external features of the fastener 166 such as a socket drive coupled to a hex-shaped fastener head. In addition, the tool 110 may be configured as a removable drill guide 130 sized and configured to receive a drill bit 164 mounted in a drill gun 162 for drilling an engagement hole 178 in the fastener 166 as illustrated in FIG. 10 and/or for drilling a fastener hole 176 in the structure 168 as illustrated in FIG. 14.

Figure 15:
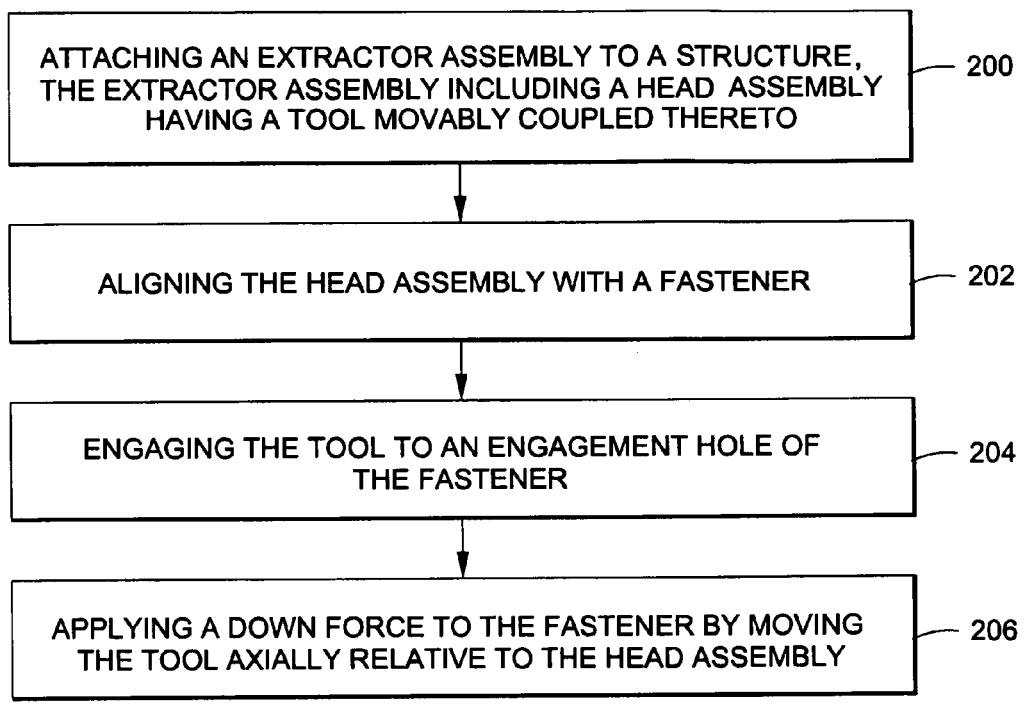
FIG. 15 is a methodology of engaging a fastener using the guide assembly.

Referring to FIG. 15 and with additional reference to FIGS. 1-14, shown is a flow diagram illustrating a methodology for engaging a fastener 166 that may be mounted in a structure 168. The method may comprise step 200 of attaching the guide assembly 10 to the structure 168. As described above, the tool 110 is axially movable relative to the head assembly 50 to exert the down force on the structure 168 when the frame assembly 12 is attached to the structure 168. The guide assembly 10 may include the frame assembly 12 having one or more arms (e.g., first and second arms 14, 16) to facilitate attachment of the frame assembly 12 to the structure 168. The arms may be adjustably positioned relative to one another in any one of a variety of tube angles $\theta_t$ such as that which is illustrated in FIG. 3. In this regard, the step of attaching the guide assembly 10 to the structure 168 may further comprise loosening the swivel mechanism 18 by rotating the swivel handle 32 such that the first and second arms 14, 16 are freely pivotable relative to one another. The method may then comprise adjusting an orientation of the first and second arms 14, 16 relative to one another to facilitate attachment of the frame assembly 12 to the structure 168. The method may further include tightening or clamping the swivel mechanism 18 in order to lock the orientation of the first arm 14 relative to the second arm 16 by rotating the swivel handle 32 to clamp the first and second arms 14, 16 between the upper, intermediate and lower fittings 26, 28, 30 as illustrated in FIG. 9.

Referring still to FIG. 15, the methodology of engaging a fastener 166 with the tool 110 using the guide assembly 10 may further comprise loosening or disengaging the clamping mechanisms connecting the clamping assemblies 34 to the first and/or second arms 16. The step of attaching the guide assembly 10 to the structure 168 may comprise loosening the clamp mechanism 40 such that the clamp mechanism 40 is adjustably orientatable relative to one of the first and second arms 14, 16. The step may further comprise adjusting the orientation of the clamping assemblies 34 such that each one of the clamping assemblies 34 is preferably substantially aligned with the surface 170. In this regard, the clamping assemblies 34 are preferably oriented to be co-planar with the surface 170. For contoured surfaces, the method may comprise orienting the clamping assemblies 34 to be substantially parallel to a tangent of a contoured surface 170. Upon adjusting the orientation of the clamping assemblies 34, the step may further comprise tightening the mounting of the clamping mechanisms 40 in order to lock the orientation of the clamping assemblies 34 relative to the first and second arms 14, 16.

Upon positioning of the vacuum assemblies and/orientation of the first and second arms 14, 16 relative to one another, the step of attaching the guide assembly 10 to the structure 168 may further comprise applying a vacuum to the vacuum cup assembly 42 configuration of the clamping assembly 34. In this manner, a suction force is applied to the surface 170 by the vacuum cup assemblies 42 in order to attach the guide assembly 10 thereto. For the magnetic assembly 44 configuration of the clamping assembly 34 as illustrated in FIGS. 4 and 5, the step of attaching the guide assembly 10 to the structure 168 may comprise applying an electric current to each one of the electromagnets 48 of the magnetic assemblies 44 in order to magnetically attract the magnetic assemblies 44 to the structure 168. As was indicated above, the structure 168 is preferably fabricated of ferrous (e.g., metallic) material or any other magnetically attractable material.

Referring still to FIG. 15, step 202 may comprise aligning the head assembly 50 with the fastener 166 after or during attachment of the guide assembly 10 to the structure 168. As indicated above, the head assembly 50 may include the bearing assembly 70 such as the spherical bearing 74 contained within the bearing collar 72 of the bearing body as illustrated in FIGS. 7-14. The orientation of the spherical bearing 74 may be adjusted by loosening the clamping force exerted thereupon by the head body 52. More specifically the head handle 54 may then be rotated to clamp the orientation of the spherical bearing 74. In this manner, and with reference to FIGS. 9-14, the head assembly 50 may be aligned with the fastener 166 or with the surface 170 by aligning the tool axis 104 of the tool 110 with the fastener axis 180 of the fastener 166. In this regard, the spherical bearing 74 may be rotated within the bearing collar 72 until the tool axis 104 is substantially aligned with the fastener axis 180.

Step 204 may comprise engaging the tool 110 to the engagement hole 178 of the fastener 166. As described above, the head assembly 50 includes the tool sleeve 96 which may be threadably coupled to the head assembly 50 such that rotation of the tool sleeve 96 relative to the head assembly 50 causes relative axial movement therebetween. In this manner, the tool 110 may be axially moved away from the head assembly 50. In order to engage the tool 110 to the engagement hole 178 of the fastener 166, the tool sleeve 96 may be rotated relative to the head assembly 50 as shown in FIG. 11 until the tool 110 engages the engagement hole 178 formed in the fastener 166 as illustrated in FIG. 12. Step 206 may comprise applying the down force to the fastener 166 by moving the tool 110 axially relative to the head assembly 50. The down force may be increased by increasingly rotating the tool sleeve 96 relative to the head assembly 50. For example, for configurations of the tool 110 adapted for removing the fastener 166, the tool 110 may be sized and configured as an extractor bit as shown in FIGS. 11-13. The down force may be developed by rotating the tool sleeve 96 relative to the head assembly 50 in order to embed or engage teeth of the extractor bit into the inner diameter of the engagement hole 178 in the fastener 166. The fastener 166 may then be removed by rotating the tool sleeve 96 in a counterclockwise direction in combination with rotation of the drive member 114 as illustrated in FIG. 13.

Figure 16:
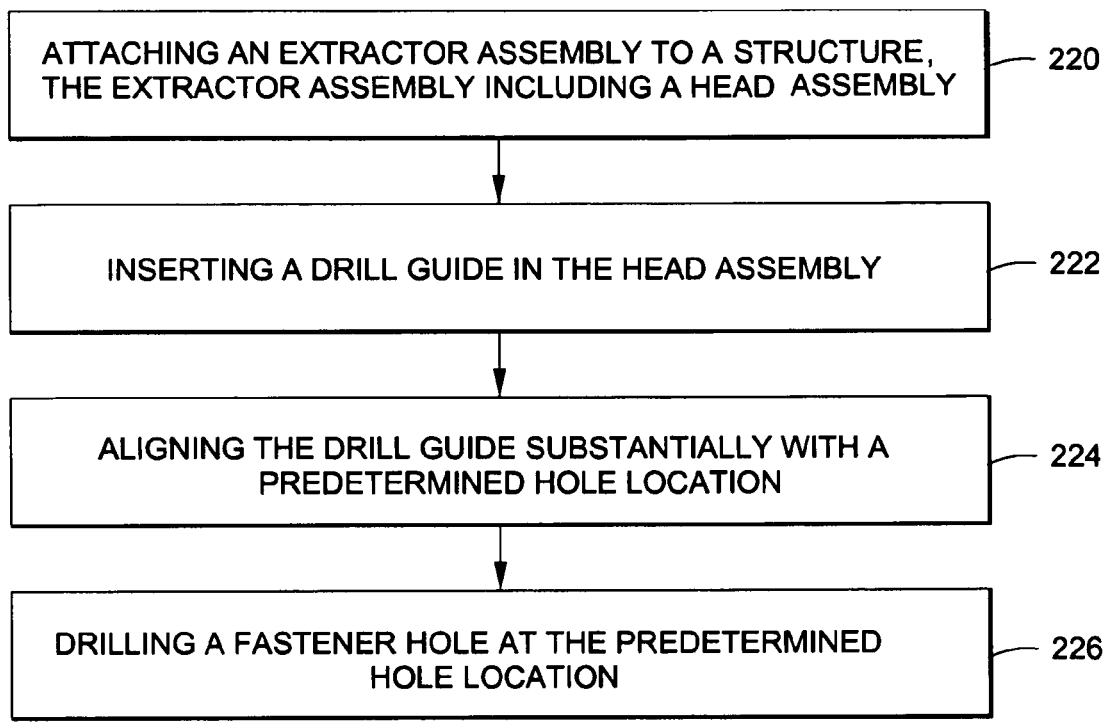
FIG. 16 is a methodology of drilling a fastener hole in the structure using the guide assembly.

Referring to FIG. 16 and with additional reference to FIGS. 1-14, shown is a flow diagram illustrating the methodology of drilling (i.e., boring or forming) a fastener hole 176 in a structure 168. The method comprises step 220 of attaching the guide assembly 10 to the structure 168 as described above. Step 222 may comprise inserting a drill guide 130 into the head assembly 50. The drill guide 130 may be configured as illustrated in FIG. 10 and may be inserted into the tool sleeve 96. The drill guide 130 may be provided in any length including a length sufficient to contact the surface 170. In an embodiment, the drill guide 130 may comprise the tool sleeve 96 wherein the tool sleeve 96 (i.e., drill guide 130) is threadably coupled to the bearing sleeve 80 as illustrated in FIG. 14. The drill guide 130 (i.e., tool sleeve 96) may extend completely through the bearing sleeve 80 and may contact the surface 170 of the structure 168 into which the fastener hole 176 is to be drilled or formed. A down force may be applied by rotating the tool sleeve 96 (i.e., drill guide 130) to force the drill guide 130 against the surface 170. Step 224 may comprise aligning the drill guide 130 substantially with a predetermined hole location 184. For example, as illustrated in FIG. 14, the frame assembly 12 may be mounted such that the drill guide 130 is centered on a predetermined hole location 184. In addition, the drill guide 130 may be substantially aligned with the hole axis of the fastener hole 176 at the predetermined hole location 184 by loosening the spherical bearing 74 and adjusting the orientation thereof. Step 226 may comprise drilling the fastener hole 176 at the predetermined hole location 184 such as illustrated in FIGS. 10 and 14.

Figure 17:
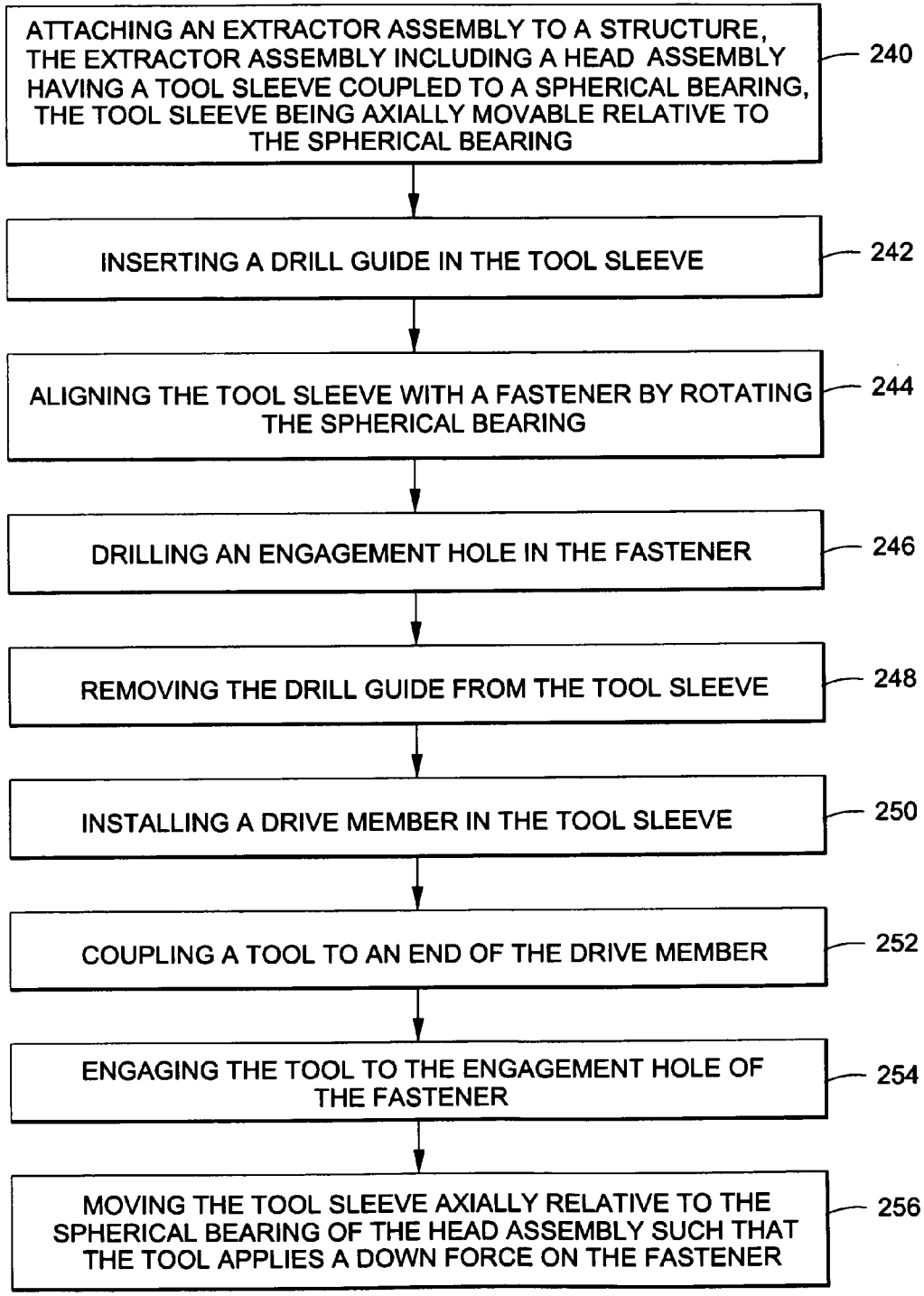
FIG. 17 is a methodology of engaging a fastener mounted in the structure.

Referring to FIG. 17, shown is a flow chart illustrating a methodology of removing a fastener 166 mounted in a structure 168. The method may comprise step 240 of attaching the guide assembly 10 to the structure 168 in the manner as described above with reference to the flow chart of FIG. 15. The guide assembly 10 includes the head assembly 50 which has the tool sleeve 96 coupled to the spherical bearing 74. The tool sleeve 96 may be axially movable relative to the spherical bearing 74. Step 242 may comprise inserting the drill guide 130 into the tool sleeve 96 in the manner illustrated in FIG. 10. The drill guide 130 preferably has an outer diameter that is sized to be complementary to an inner diameter of the tool sleeve 96. Likewise, the drill guide 130 preferably has an inner diameter that is preferably sized and configured complementary to an outer diameter of the drill bit 164. In an embodiment, the tool sleeve 96 may comprise the drill guide 130 as illustrated in FIG. 14 such that the drill guide 130 is threadably coupled to the bearing sleeve 80.

Step 244 may comprise aligning the tool sleeve 96 or drill guide 130 with the fastener 166 by rotating the spherical bearing 74. In a manner as indicated above, the tool sleeve 96 or drill guide 130 may be oriented into substantial alignment with the fastener 66 by loosening the head handle 54, orienting the tool sleeve 96 or drill guide 130 into alignment with the fastener 166, and then rotating the head handle 54 in order to tighten the head body 52 around the spherical bearing 74 to prevent rotation thereof. Step 246 may comprise drilling the engagement hole 178 in the fastener 166 as illustrated in FIG. 10. For example, an operator may insert a drill bit 164 into the drill guide 130 as shown in FIG. 10 to drill the engagement hole 178 in the fastener 166. The engagement hole 178 is preferably centered in the fastener 166 in order to prevent breakout of the drill bit 164 into a side of the fastener 166 which may damage the threaded bore (i.e., fastener hole 176) into which the fastener 166 is mounted. In addition, the tool axis 104 is preferably substantially aligned (i.e., parallel with) the fastener axis 180.

Step 248 comprises removing the drill guide 130 from the tool sleeve 96. The methodology may comprise installing the drive member 114 in the tool sleeve 96 in step 250 as illustrated in FIG. 11. As indicated above, the drive member 114 includes distal and proximal ends 118, 120 with the distal end 120 being coupled to the adapter 124 which, in turn, may be coupled to the tool 110. Alternatively, the tool 110 may be directly coupled to the drive member 114 such as by engagement of a square drive on the distal end 120 of the drive member 114 to an internal recess square drive formed in the tool 110. In this regard, step 252 comprises coupling the tool 110 to an end of the drive member 114 such as to the proximal end 118 thereof. Ball and detents as shown in FIG. 8 or other suitable mechanisms, if included, may maintain attachment of the drive member 114 to the adapter 124 and attachment of the adapter 124 to the tool 110. Step 254 comprises engaging the tool 110 to the engagement hole 178 of the fastener 166 as illustrated in FIG. 12. As indicated above, the tool sleeve 96 is preferably threadably coupled to the spherical bearing 74 such that the tool sleeve 96 may be moved axially relative to the spherical bearing 74 in step 256 in a manner to cause axial movement of the tool 110.

The drive member 114 may be freely rotatable relative to the tool sleeve 96 such that the tool sleeve 96 may be axially moved independent of rotation of the tool 110. Increasing amounts of down force may be applied to the fastener 166 via the tool 110 by holding the drive member 114 in non-rotating relation to the tool sleeve 96. More specifically, by rotating the tool sleeve 96 while holding the drive member 114 stationary, the tool 110 may be extended further away from the head assembly 50 resulting in an increasing amount of down force applied to the fastener 166. In this manner, the teeth of the screw drive bit 128 or screw extractor bit may be engaged to the material along the inner diameter of the engagement hole 178 in the fastener 166. Removal of the fastener 166 may be facilitated by rotating the screw extractor bit while simultaneously rotating the tool sleeve 96. The rotation of the tool 110 and tool sleeve 96 may also be performed in such a manner that down force may be continuously applied to the tool 110. Furthermore, by rotating the tool sleeve 96 at a slower rate than the rate at which the drive member 114 is rotated, a gradually decreasing amount of down force may be applied on the fastener 166 as the fastener 166 is removed.

Figure 18:
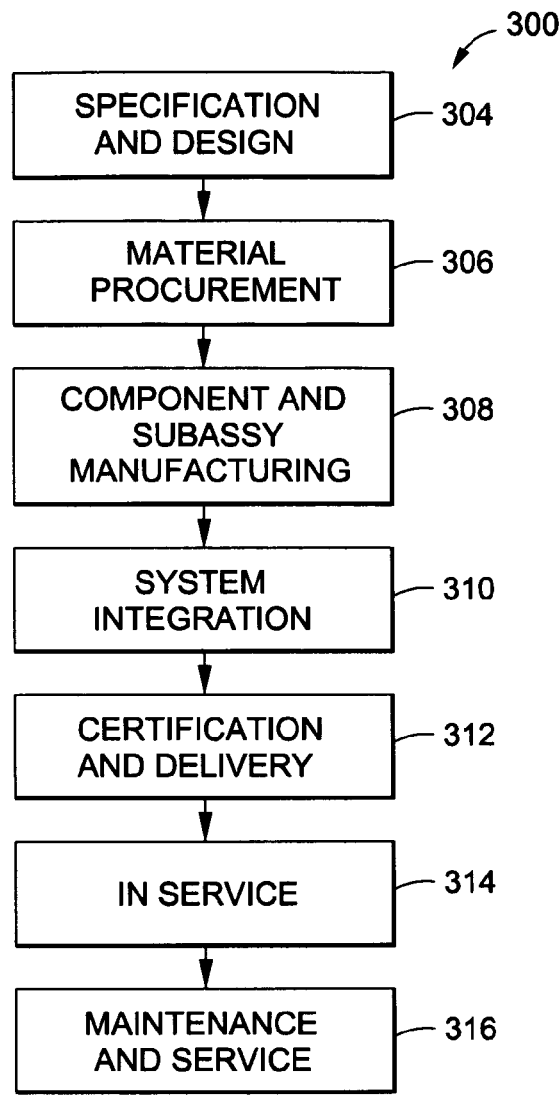
FIG. 18 is a flow diagram of an aircraft production and service methodology.
Figure 19:
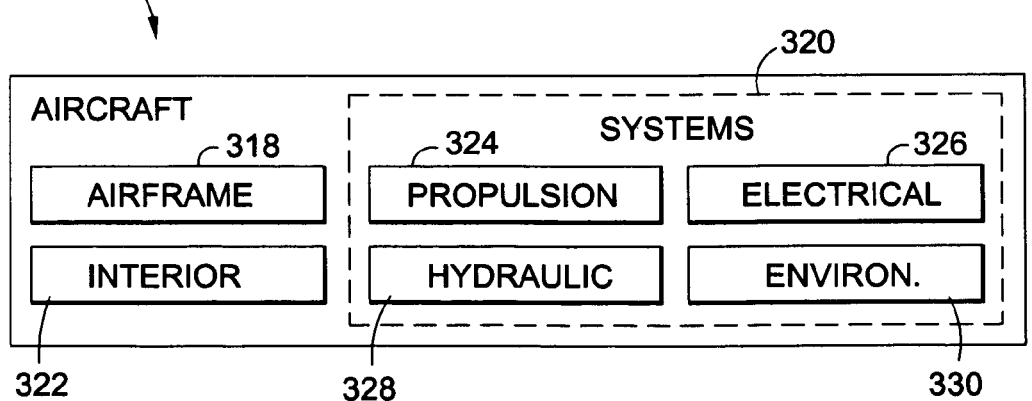
FIG. 19 is a block diagram of an aircraft.

Referring to FIGS. 18-19, embodiments of the disclosure may be described in the context of an aircraft manufacturing and service method 300 as shown in FIG. 18 and an aircraft 302 as shown in FIG. 19. During pre-production, exemplary method 300 may include specification and design 304 of the aircraft 302 and material procurement 306. During production, component and subassembly manufacturing 308 and system integration 310 of the aircraft 302 takes place. Thereafter, the aircraft 302 may go through certification and delivery 312 in order to be placed in service 314. While in service by a customer, the aircraft 302 is scheduled for routine maintenance and service 316 (which may also include modification, reconfiguration, refurbishment, and so on).

Each of the processes of method 300 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 19, the aircraft 302 produced by exemplary method 300 may include an airframe 318 with a plurality of systems 320 and an interior 322. Examples of high-level systems 320 include one or more of a propulsion system 324, an electrical system 326, a hydraulic system 328, and an environmental system 330. Any number of other systems may be included. Although an aerospace example is shown, the principles of the disclosed embodiments may be applied to other industries, such as the automotive industry.

Apparatus and methods embodied herein may be employed during any one or more of the stages of the production and service method 300. For example, components or subassemblies corresponding to production process 308 may be fabricated or manufactured in a manner similar to components or subassemblies produced while the aircraft 302 is in service. Also, one or more apparatus embodiments, method embodiments, or a combination thereof may be utilized during the production stages 308 and 310, for example, by substantially expediting assembly of or reducing the cost of an aircraft 302. Similarly, one or more of apparatus embodiments, method embodiments, or a combination thereof may be utilized while the aircraft 302 is in service, for example and without limitation, to maintenance and service 316

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of engaging a fastener, comprising the steps of:

attaching a guide assembly to a structure, the guide assembly including a first arm, a second arm, and a head assembly mounted to an end of the first arm;

threadably engaging a tool sleeve to the head assembly;
coupling a tool to the tool sleeve;
adjusting, using a swivel mechanism, an angular orientation of the second arm relative to the first arm;
clamping the first arm to the second arm using the swivel mechanism;
engaging the tool to the fastener;
rotating the tool sleeve relative to the head assembly; and
applying a down force to the fastener in response to rotating the tool sleeve to move the tool axially relative to the head assembly.

2. The method of claim 1 further comprising the step of:
rotating the tool while applying the down force to remove the fastener.

3. The method of claim 1 wherein, the step of applying the down force to the fastener comprises:
rotating the tool sleeve relative to the head assembly to axially move the tool away from head assembly.

4. The method of claim 1 further comprising the step of:
aligning the head assembly with the fastener.

5. The method of claim 4 wherein the tool and the fastener respectively define a tool axis and a fastener axis, the head assembly including a spherical bearing having the tool coupled thereto, the step of aligning the head assembly with the fastener comprising:
rotating the spherical bearing until the tool axis is substantially aligned with the fastener axis.

6. The method of claim 1 wherein the guide assembly includes at least one vacuum cup assembly mountable to a surface of the structure, the step of mounting the guide assembly to the structure comprising:
applying a vacuum to the vacuum cup assembly to attach the guide assembly to the surface.

7. The method of claim 1 wherein the guide assembly includes at least one magnet assembly configured as an electromagnet, the step of attaching the guide assembly to the structure comprising:
applying an electric current to the electromagnet to attach the guide assembly to the structure.

8. The method of claim 1 wherein the first and second arms each have at least one clamping assembly mounted thereto, the step of attaching the guide assembly to the structure comprising:
adjusting an orientation of the clamping assemblies such that the clamping assemblies are substantially aligned with the structure.

\* \* \* \* \*